(12) United States Patent
Sakaguchi et al.

(10) Patent No.: US 12,444,170 B2
(45) Date of Patent: Oct. 14, 2025

(54) PROGRAM, INFORMATION PROCESSING METHOD, METHOD FOR GENERATING LEARNING MODEL, METHOD FOR RELEARNING LEARNING MODEL, AND INFORMATION PROCESSING SYSTEM

(71) Applicant: TERUMO KABUSHIKI KAISHA, Tokyo (JP)

(72) Inventors: Yuki Sakaguchi, Isehara (JP); Yusuke Seki, Tokyo (JP); Akira Iguchi, Mishima (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 460 days.

(21) Appl. No.: 17/954,770

(22) Filed: Sep. 28, 2022

(65) Prior Publication Data

US 2023/0042524 A1 Feb. 9, 2023

Related U.S. Application Data

(63) Continuation of application No. PCT/JP2021/009337, filed on Mar. 9, 2021.

(30) Foreign Application Priority Data

Mar. 30, 2020 (JP) .............................. 2020-061510

(51) Int. Cl.
*G06V 10/764* (2022.01)
*G06T 7/00* (2017.01)
(Continued)

(52) U.S. Cl.
CPC .......... *G06V 10/774* (2022.01); *G06T 7/0012* (2013.01); *G06T 7/62* (2017.01);
(Continued)

(58) Field of Classification Search
CPC ........... A61B 8/0891; A61B 8/12; A61B 8/14; A61B 8/5223; A61B 5/0066;
(Continued)

(56) References Cited

U.S. PATENT DOCUMENTS 5,157,733 A 10/1992 Takeo et al.
2006/0222221 A1 10/2006 Sathyanarayana
(Continued)

FOREIGN PATENT DOCUMENTS

CN 101466312 A 6/2009
CN 101953696 A 1/2011
(Continued)

OTHER PUBLICATIONS

International Search Report (PCT/ISA/210) with translation and Written Opinion (PCT/ISA/237) mailed on May 25, 2021, by the Japanese Patent Office as the International Searching Authority for International Application No. PCT/JP2021/009337. (13 pages).
(Continued)

*Primary Examiner* — Tsung Yin Tsai
(74) *Attorney, Agent, or Firm* — Buchanan Ingersoll & Rooney PC

(57) ABSTRACT

A program and the like that make a catheter system relatively easy to use. The program including a non-transitory computer-readable medium (CRM) storing computer program code executed by a computer processor that executes a process comprising: acquiring a tomographic image generated using a diagnostic imaging catheter inserted into a lumen organ; and inputting the acquired tomographic image to a first model configured to output types of a plurality of objects included in the tomographic image and ranges of the respective objects in association with each other when the tomographic image is input, and outputting the types and ranges of the objects output from the first model.

18 Claims, 22 Drawing Sheets

(51) Int. Cl.
  *G06T 7/62* (2017.01)
  *G06V 10/774* (2022.01)
  *G06V 10/776* (2022.01)
  *G06V 10/778* (2022.01)
  *A61B 8/14* (2006.01)

(52) U.S. Cl.
  CPC .......... *G06V 10/764* (2022.01); *G06V 10/776* (2022.01); *G06V 10/778* (2022.01); *A61B 8/14* (2013.01); *G06T 2207/10072* (2013.01); *G06T 2207/20081* (2013.01); *G06T 2207/20084* (2013.01); *G06T 2207/30096* (2013.01); *G06T 2207/30101* (2013.01); *G06V 2201/031* (2022.01)

(58) Field of Classification Search
  CPC .............. A61B 5/0084; A61B 5/02007; A61B 1/00172; A61B 5/1076; A61B 5/6852; A61B 5/7264; A61B 5/7267; A61B 6/504; A61B 6/5217; A61B 5/055; A61B 5/1075; A61B 6/03; A61B 6/032; A61B 6/463; A61B 6/025; A61B 6/466; A61B 6/502; A61B 6/5205; A61B 6/5235; A61B 6/54; G06T 2200/24; G06T 2207/10016; G06T 2207/10072; G06T 2207/10101; G06T 2207/20081; G06T 2207/20084; G06T 2207/30096; G06T 2207/30101; G06T 7/0012; G06T 7/11; G06T 7/62; G06T 7/13; G06T 7/0014; G06T 11/60; G06T 19/20; G06T 2200/08; G06T 2207/20076; G06T 2207/20104; G06T 2207/20224; G06T 2210/41; G06T 2211/404; G06T 2219/2012; G06T 5/50; G06T 7/12; G06T 7/45; G06T 2207/10136; G06T 2207/30061; G06T 7/155; G06T 2200/04; G06T 2207/10081; G06T 2207/30068; G06T 7/33; G06V 10/764; G06V 10/774; G06V 10/776; G06V 10/778; G06V 2201/031; G16H 50/20; G06F 18/00
  See application file for complete search history.

(56) References Cited

U.S. PATENT DOCUMENTS

| | | |
|---|---|---|
| 2007/0038062 A1 | 2/2007 | Redel |
| 2010/0249580 A1 | 9/2010 | Goto et al. |
| 2014/0194738 A1* | 7/2014 | Rice ..................... A61B 8/5207 |
| | | 600/443 |
| 2016/0171711 A1 | 6/2016 | Gopinath et al. |
| 2017/0055929 A1 | 3/2017 | Machida et al. |
| 2018/0214120 A1* | 8/2018 | Sakaguchi ........ A61M 25/0105 |
| 2019/0021694 A1* | 1/2019 | Sakaguchi ........... A61B 5/0084 |
| 2020/0129147 A1* | 4/2020 | Nair ..................... A61B 8/469 |
| 2020/0160544 A1* | 5/2020 | Yao ..................... A61B 6/5205 |
| 2020/0294659 A1* | 9/2020 | Gopinath .............. G06F 3/0485 |

FOREIGN PATENT DOCUMENTS

| | | |
|---|---|---|
| CN | 107872963 A | 4/2018 |
| CN | 110136157 A | 8/2019 |
| JP | H03102477 A | 4/1991 |
| JP | 2000-048502 A | 2/2000 |
| JP | 2007007410 A | 1/2007 |
| JP | 2008535566 A | 9/2008 |
| JP | 2010075616 A | 4/2010 |
| JP | 2010220902 A | 10/2010 |
| JP | 2017042558 A | 3/2017 |
| JP | 2019518581 A | 7/2019 |
| JP | 2020010805 A | 1/2020 |
| WO | 2007145093 A1 | 12/2007 |
| WO | 2017164071 A1 | 9/2017 |
| WO | 2017214421 A1 | 12/2017 |

OTHER PUBLICATIONS

Office Action (Notice of Reasons for Refusal) issued on Jun. 11, 2024, in corresponding Japanese Patent Application No. 2022-511733 and English translation of the Office Action. (14 pages).

Office Action/Search Report (The First Office Action) issued on Jan. 22, 2025, in corresponding Chinese Patent Application No. 202180026844.1 and English translation of the Office Action. (18 pages).

* cited by examiner

| TOMOGRAPHIC IMAGE DATA | PAINTING AND CLASSIFICATION DATA | FINDING | | | |
|---|---|---|---|---|---|
| | | TREATMENT NECESSITY | BLOOD FLOW STAGNATION | BRANCH | ...... |
| IMG001 | IMGP001 | YES | YES | NO | ...... |
| IMG002 | IMGP002 | NO | NO | YES | ...... |

| TOMOGRAPHIC IMAGE DATA | OUTPUT DATA | CORRECTION DATA |
|---|---|---|
| IMG100 | IMGP100 | IMGQ100 |
| IMG111 | IMGP111 | IMGQ111 |

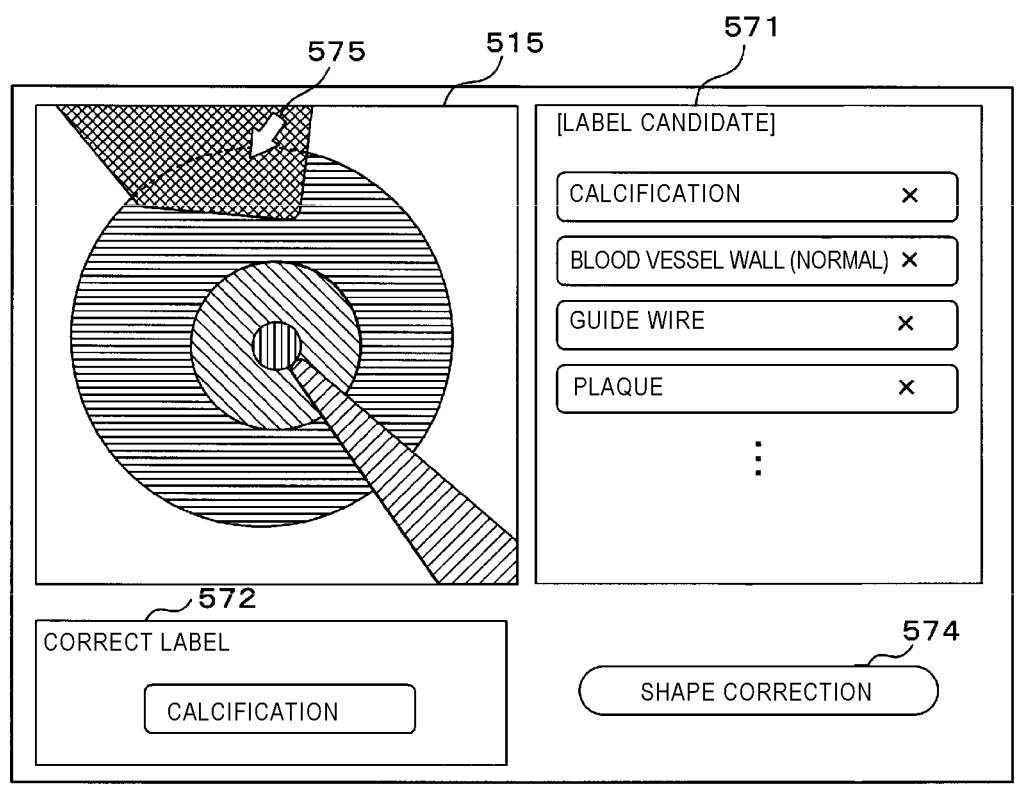

PROGRAM, INFORMATION PROCESSING METHOD, METHOD FOR GENERATING LEARNING MODEL, METHOD FOR RELEARNING LEARNING MODEL, AND INFORMATION PROCESSING SYSTEM

CROSS-REFERENCES TO RELATED APPLICATIONS

This application is a continuation of International Application No. PCT/JP2021/009337 filed on Mar. 9, 2021, which claims priority to Japanese Application No. 2020-061510 filed on Mar. 30, 2020, the entire content of both of which is incorporated herein by reference.

TECHNOLOGICAL FIELD

The present disclosure generally relates to a program, an information processing method, a method for generating a learning model, a method for relearning a learning model, and an information processing system.

BACKGROUND DISCUSSION

International Patent Application Publication No. WO2017/164071 discloses a catheter system in which a diagnostic imaging catheter is inserted into a lumen organ such as a blood vessel to capture a tomographic image.

To interpret the tomographic image captured using the diagnostic imaging catheter one requires certain skills. Therefore, it is necessary to perform training in order to use the catheter system.

SUMMARY

A program or the like is disclosed that makes a catheter system relatively easy to use.

A non-transitory computer-readable medium (CRM) storing computer program code executed by a computer processor that executes a process comprising: acquiring a tomographic image generated using a diagnostic imaging catheter inserted into a lumen organ; and inputting the acquired tomographic image to a first model configured to output types of a plurality of objects included in the tomographic image and ranges of the respective objects in association with each other when the tomographic image is input, and outputting the types and the ranges of the objects output from the first model.

In accordance with another aspect, a method is disclosed for generating a learning model comprising: acquiring training data in which a plurality of sets of a tomographic image generated using a diagnostic imaging catheter inserted into a lumen organ, and types and ranges of objects included in the tomographic image are recorded in association with each other; and generating, using the training data, a learning model configured to output the types of a plurality of objects included in the tomographic image in association with the ranges of the objects when the tomographic image is input.

In accordance with a further aspect, an information processing system is disclosed comprising: an acquisition unit configured to acquire a tomographic image generated using a diagnostic imaging catheter inserted into a lumen organ; and an output unit configured to input the acquired tomographic image to a model configured to output types of a plurality of objects included in the tomographic image and ranges of the respective objects in association with each other when the acquisition unit inputs the acquired tomographic image, and output the types and ranges of the objects output from the model.

According to this aspect, it is possible to provide a program, for example, a non-transitory computer-readable medium (CRM) storing computer program code executed by a computer processor that executes a process that makes the catheter system relatively easy to use.

BRIEF DESCRIPTION OF THE DRAWINGS

FIG. 22 illustrates an example of a screen displayed by a catheter system according to a seventh embodiment.

FIG. 23 is a diagram illustrating a record layout of a second correction DB.

DETAILED DESCRIPTION

Set forth below with reference to the accompanying drawings is a detailed description of embodiments of a program, an information processing method, a method for generating a learning model, a method for relearning a learning model, and an information processing system. Note that since embodiments described below are preferred specific examples of the present disclosure, although various technically preferable limitations are given, the scope of the present disclosure is not limited to the embodiments unless otherwise specified in the following descriptions.

First Embodiment

Figure 1:
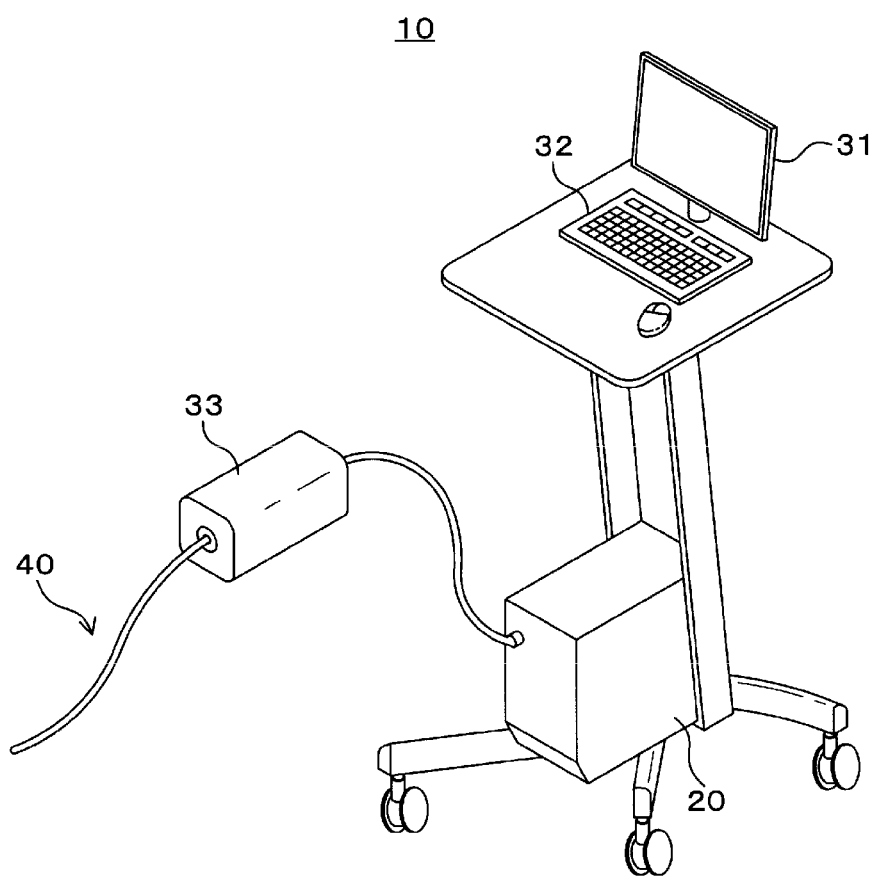
FIG. 1 is a diagram illustrating an outline of a catheter system.

FIG. 1 is a diagram illustrating an outline of a catheter system 10. The catheter system 10 can include a diagnostic imaging catheter 40, a motor driving unit or motor drive unit (MDU) 33, and an information processing apparatus 20. The diagnostic imaging catheter 40 is connected to the information processing apparatus 20 via the MDU 33. A display apparatus 31 and an input apparatus 32 are connected to the information processing apparatus 20. The input apparatus 32 can be, for example, a keyboard, a mouse, a trackball, or a microphone. The display apparatus 31 and the input apparatus 32 may be integrally stacked to form a touch panel. The input apparatus 32 and the information processing apparatus 20 may be integrally formed.

Figure 2:
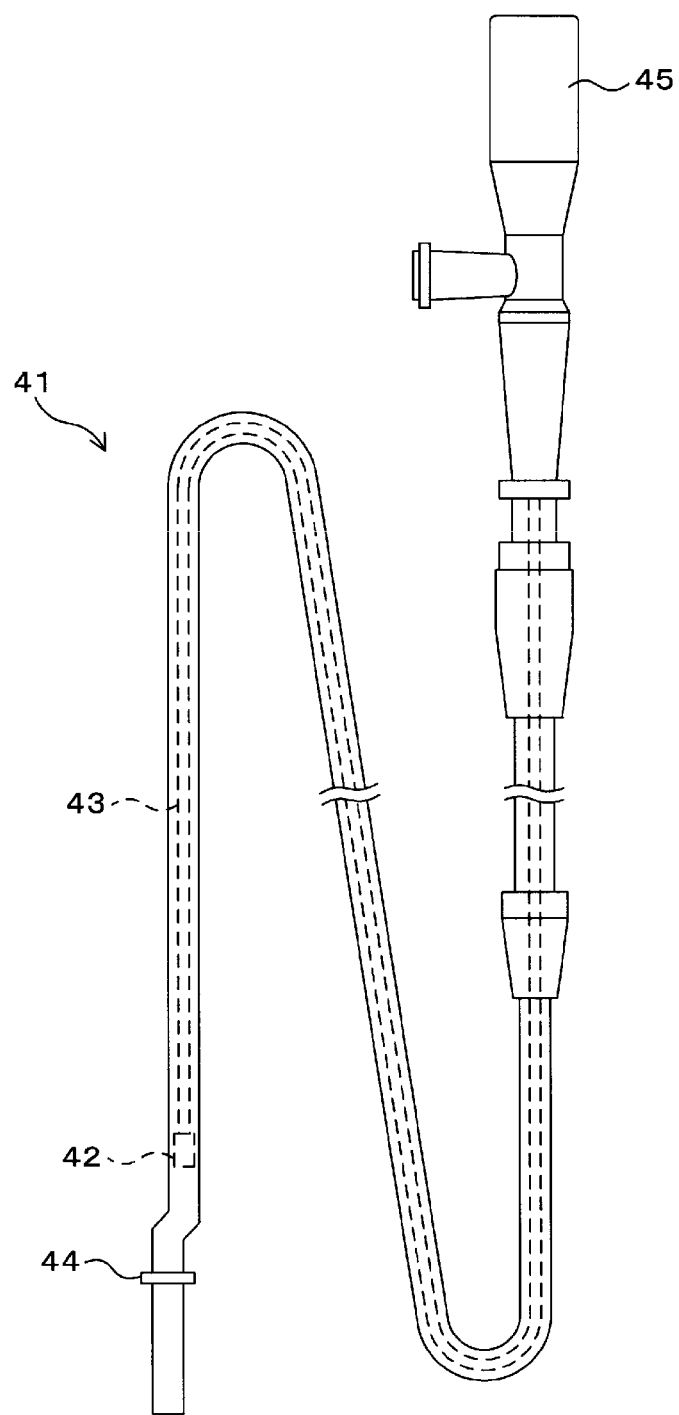
FIG. 2 is a diagram illustrating an outline of a diagnostic imaging catheter.

FIG. 2 is a diagram illustrating an outline of the diagnostic imaging catheter 40. The diagnostic imaging catheter 40 includes a probe unit 41 and a connector unit 45 disposed at an end portion of the probe unit 41. The probe unit 41 is connected to the MDU 33 via the connector unit 45. In the following description, a side far from the connector unit 45 of the diagnostic imaging catheter 40 is referred to as a distal side.

A shaft 43 is inserted into the probe unit 41. A sensor 42 is connected to a distal side of the shaft 43. An annular distal end marker 44 is fixed in the vicinity of a distal end portion of the probe unit 41.

A function of the MDU 33 enables the sensor 42 and the shaft 43 to move forward and backward while rotating inside the probe unit 41. When a pull-back operation in which the sensor 42 is rotated while being pulled toward the MDU 33 at a constant speed is performed, a plurality of lateral tomographic images 485 (see FIG. 4) that are substantially perpendicular to the probe unit 41 with the probe unit 41 serving as a center are continuously captured at predetermined intervals.

The sensor 42 can be, for example, an ultrasound transducer that transmits and receives ultrasound, or a transmission and reception unit for optical coherence tomography (OCT) that emits near-infrared light and receives reflected light. A lumen organ into which the diagnostic imaging catheter 40 is inserted and used can be, for example, a blood vessel, a pancreatic duct, a bile duct, or a bronchus.

FIG. 2 illustrates an example of the diagnostic imaging catheter 40 for intravascular ultrasound (IVUS) used when an ultrasound tomographic image is captured from an inner side of a blood vessel. In the following description, a case where the diagnostic imaging catheter 40 is an IVUS catheter will be described as an example.

Note that the diagnostic imaging catheter 40 is not limited to a mechanical scanning manner in which the diagnostic imaging catheter 40 is mechanically rotated and moved forward and backward. The diagnostic imaging catheter 40 may be of an electronic radial scanning type using the sensor 42 in which a plurality of ultrasound transducers are annularly arranged.

The diagnostic imaging catheter 40 may include the sensor 42 of a so-called linear scanning type in which a plurality of ultrasound transducers are arranged in a line along a longitudinal direction. The diagnostic imaging catheter 40 may include the sensor 42 of a so-called two-dimensional array type in which a plurality of ultrasound transducers are arranged in a matrix.

The diagnostic imaging catheter 40 can capture a tomographic image including a reflector present in a lumen of a lumen organ such as a red blood cell and an organ present outside the lumen organ such as a pericardium and heart, in addition to a lumen wall such as a blood vessel wall.

Figure 3:
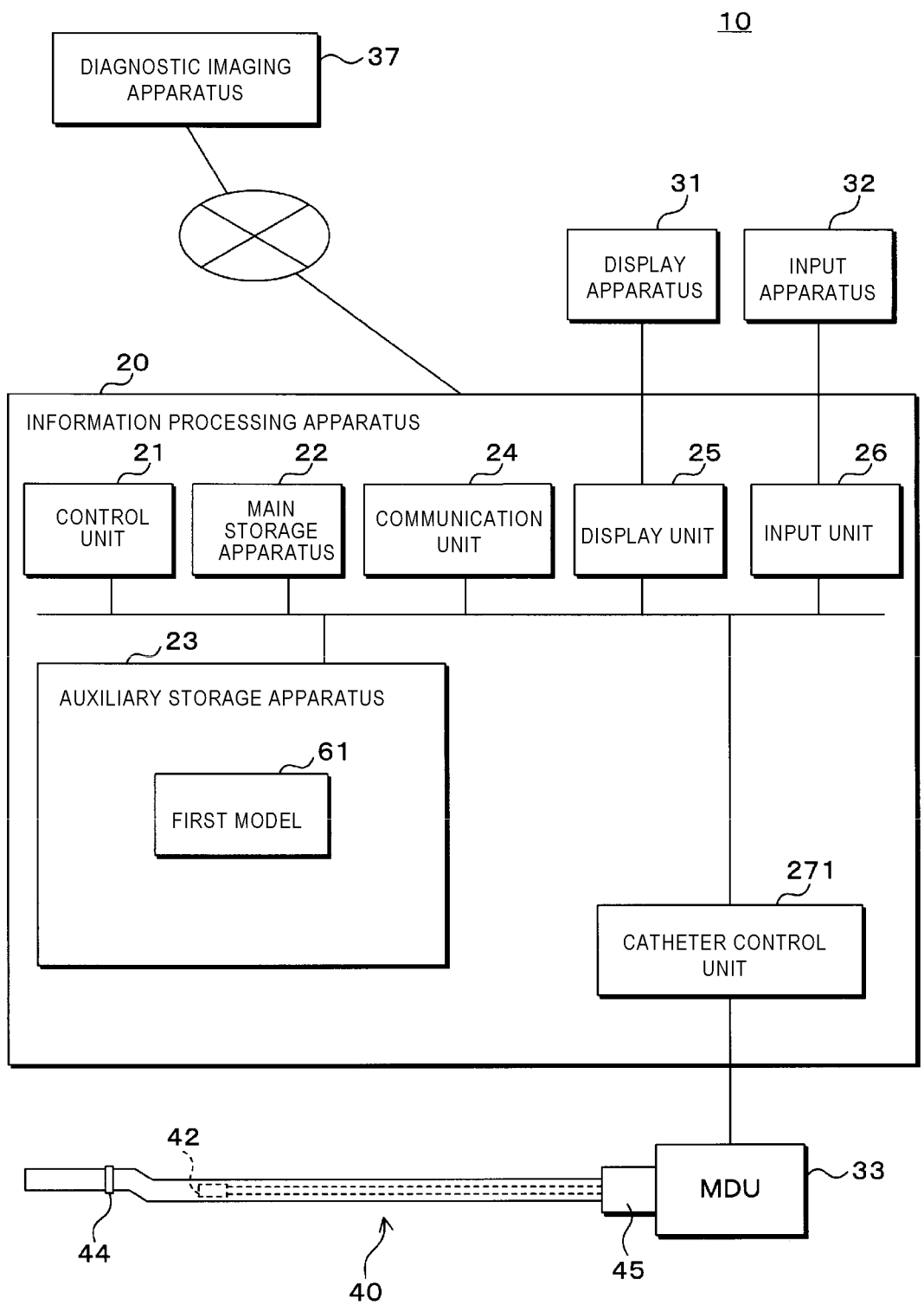
FIG. 3 is a diagram illustrating a configuration of the catheter system.

FIG. 3 is a diagram illustrating a configuration of the catheter system 10. As described above, the catheter system 10 includes the information processing apparatus 20, the MDU 33, and the diagnostic imaging catheter 40. The information processing apparatus 20 can include a control unit 21, a main storage apparatus 22, an auxiliary storage apparatus 23, a communication unit 24, a display unit 25, an input unit 26, a catheter control unit 271, and a bus.

The control unit 21 is a calculation and control apparatus that executes a program according to the present embodiment. One or a plurality of central processing units (CPU), graphics processing units (GPU), tensor processing units (TPU), multi-core CPUs, or the like are used as the control unit 21. The control unit 21 is connected to hardware units constituting the information processing apparatus 20 via the bus.

The main storage apparatus 22 is a storage apparatus such as a static random access memory (SRAM), a dynamic random access memory (DRAM), or a flash memory. The main storage apparatus 22 temporarily stores information required during a processing executed by the control unit 21 and a program being executed by the control unit 21.

The auxiliary storage apparatus 23 is a storage apparatus such as an SRAM, a flash memory, a hard disk, or a magnetic tape. The auxiliary storage apparatus 23 stores a program to be executed by the control unit 21, a first model 61, and various kinds of data necessary for executing the program. The communication unit 24 is an interface that performs communication between the information processing apparatus 20 and a network.

The display unit 25 is an interface that connects the display apparatus 31 and the bus. The input unit 26 is an interface that connects the input apparatus 32 and the bus. The catheter control unit 271 controls the MDU 33, controls the sensor 42, generates the lateral tomographic image 485 and a longitudinal tomographic image based on a signal received from the sensor 42, and the like. The function and configuration of the catheter control unit 271 are the same as those of an ultrasound diagnostic apparatus. Note that the control unit 21 may implement the function of the catheter control unit 271.

The information processing apparatus 20 is connected to various diagnostic imaging apparatuses 37 such as an X-ray blood vessel imaging apparatus, an X-ray computed tomography (CT) apparatus, a magnetic resonance imaging (MRI) apparatus, a positron emission tomography (PET) apparatus, and an ultrasound diagnostic apparatus via a hospital information system (HIS) or the like.

The information processing apparatus 20 according to the present embodiment can be a dedicated ultrasound diagnostic apparatus, or a personal computer, a tablet, a smartphone, or the like having a function of the ultrasound diagnostic apparatus.

Figure 4:
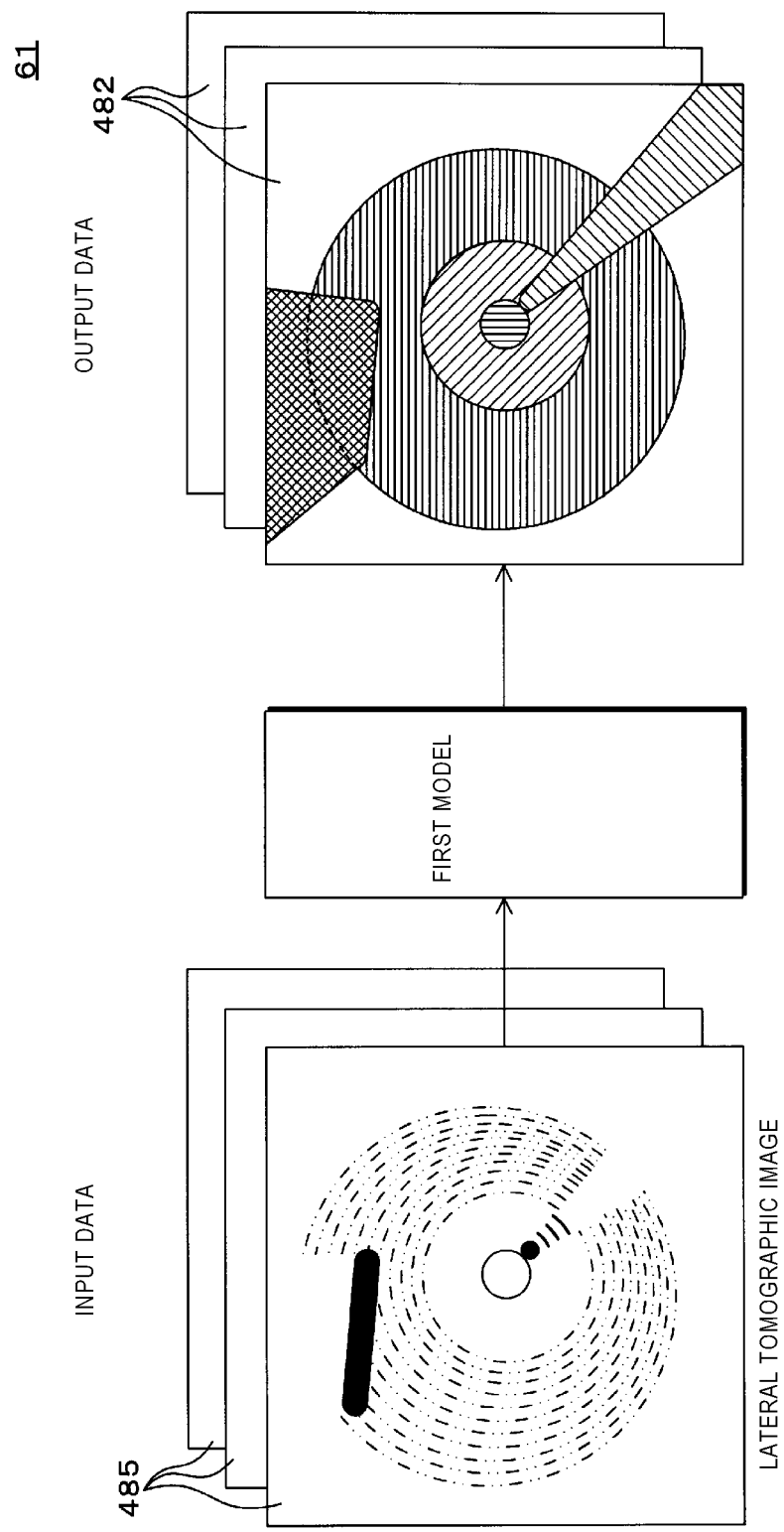
FIG. 4 is a diagram illustrating a first model.

FIG. 4 is a diagram illustrating the first model 61. The first model 61 is a model that receives the lateral tomographic image 485 and outputs an object arrangement image 482 in which types of a plurality of objects included in the lateral tomographic image 485 and ranges of the respective objects are mapped in association with each other. The first model 61 is generated by machine learning.

In the object arrangement image 482 illustrated in FIG. 4, hatching with vertical lines indicates a "cross section of the diagnostic imaging catheter 40", hatching with horizontal lines indicates a "lumen organ wall", hatching with lines downward to the right indicates an "inner side of the lumen organ", hatching with lines downward to the left indicates a "guide wire", and hatching of a thin grid shape indicates "calcification".

The "guide wire" can include the guide wire, multiple echoes generated by the guide wire, and an acoustic shadow generated by the guide wire. Similarly, the "calcification" can include a calcified portion, multiple echoes generated by the calcified portion, and an acoustic shadow generated by the calcified portion.

The hatchings in FIG. 4 schematically indicate that objects are painted and classified in different colors. The painting and classification of the objects are an example of a method for displaying the objects in a distinguishable manner. The objects may be displayed in any form such as surrounding an outer edge of each object so as to be distinguishable from other objects.

Here, the "cross section of the diagnostic imaging catheter 40", the "lumen organ wall", the "inner side of the lumen organ", the "guide wire", and the "calcification" are examples of objects included in the lateral tomographic image 485. For example, the "guide wire", the "multiple echoes generated by the guidewire", and the "acoustic shadow generated by the guide wire" may be classified into different objects. Similarly, lesion areas such as "plaque" and "dissociation" generated in a lumen organ wall may be classified into different objects.

In the following description, a set of a plurality of lateral tomographic images 485 that can be used to generate a longitudinal tomographic image will be referred to as a set of lateral tomographic images 485. Similarly, the acquisition of a set of lateral tomographic images 485 that can be used to generate a longitudinal tomographic image using the diagnostic imaging catheter 40 will be referred to as one image acquisition. An example of the first model 61 that receives an input of one set of lateral tomographic images 485 and outputs the object arrangement images 482 corresponding to the respective lateral tomographic images 485 will be described below.

One set of lateral tomographic images 485 can be acquired by, for example, one pull-back operation using the MDU 33. One set of lateral tomographic images 485 may be acquired during a user manually pushes and pulls the diagnostic imaging catheter 40. Here, an operation of pushing and pulling the diagnostic imaging catheter 40 includes both an operation of pushing and pulling the probe unit 41 and an operation of pushing and pulling the sensor 42 inside the probe unit 41.

For example, a user performs an operation of pulling back the sensor 42 at a substantially constant speed or an operation of pushing in the sensor 42. The lateral tomographic images 485 acquired during a period from when the user gives an instruction to start the acquisition by a voice input or the like up to when the user gives an instruction to end the acquisition constitute one set of lateral tomographic images 485.

A sensor or the like that detects an amount by which the user pushes and pulls the sensor 42 may be provided. Images acquired during the user pulls back the sensor 42 over a predetermined range or during the user pushes in the sensor 42 constitute one set of lateral tomographic images 485.

When a position of the sensor 42 can be detected, the user may perform the pushing and pulling operation on the sensor 42 at any speed and in any direction. The lateral tomographic images 485 rearranged in order along a longitudinal direction of the probe unit 41 constitute one set of lateral tomographic images 485. When an interval between the lateral tomographic images 485 is not constant, position information about the probe unit 41 along the longitudinal direction is recorded in association with each lateral tomographic image 485. Note that in the following description, a case where the interval between the lateral tomographic images 485 is constant will be described as an example.

As described above, the first model 61 may be a model that receives one set of lateral tomographic images 485 obtained by a pull-back operation using the MDU 33, or a model that receives an input of one set of lateral tomographic images 485 obtained by manually moving the sensor 42 forward and backward. The first model 61 may be a model that receives an input of one lateral tomographic image 485. The first model 61 may be a model that receives, for example, an input of a half, ⅓, or the like of the lateral tomographic images 485 obtained by one pull-back operation.

The first model 61 can be, for example, a semantic segmentation model, and can include an input layer, a neural network, and an output layer. The neural network has, for example, a U-Net structure that implements semantic segmentation. The U-Net structure includes a multilayer encoder layer and a multilayer decoder layer connected after the multilayer encoder layer. The semantic segmentation assigns a label indicating a type of an object to each pixel constituting an input image.

The control unit 21 can generate an output image in which objects are mapped in different colors, background patterns, or the like for each type as illustrated in the object arrangement image 482 in FIG. 4 by determining a method for displaying each pixel according to the label.

The first model 61 may be a mask regions with convolutional neural networks (R-CNN) model or a model that implements image segmentation generated based on any other machine learning algorithms.

The first model 61 may be a model such as an R-CNN that implements object detection. When a model that does not perform segmentation but performs object detection is used, the control unit 21 surrounds a portion where a target is detected with a bounding box, and displays characters such as "calcification" in the vicinity of the bounding box.

Note that when the entire set of lateral tomographic images 485 is set as input data, information about the adjacent lateral tomographic images 485 is reflected in the object arrangement image 482. Therefore, it is possible to implement the first model 61 that is less likely to be affected by noises or the like in the individual lateral tomographic image 485 and that accurately outputs a range of an object.

Figure 5:
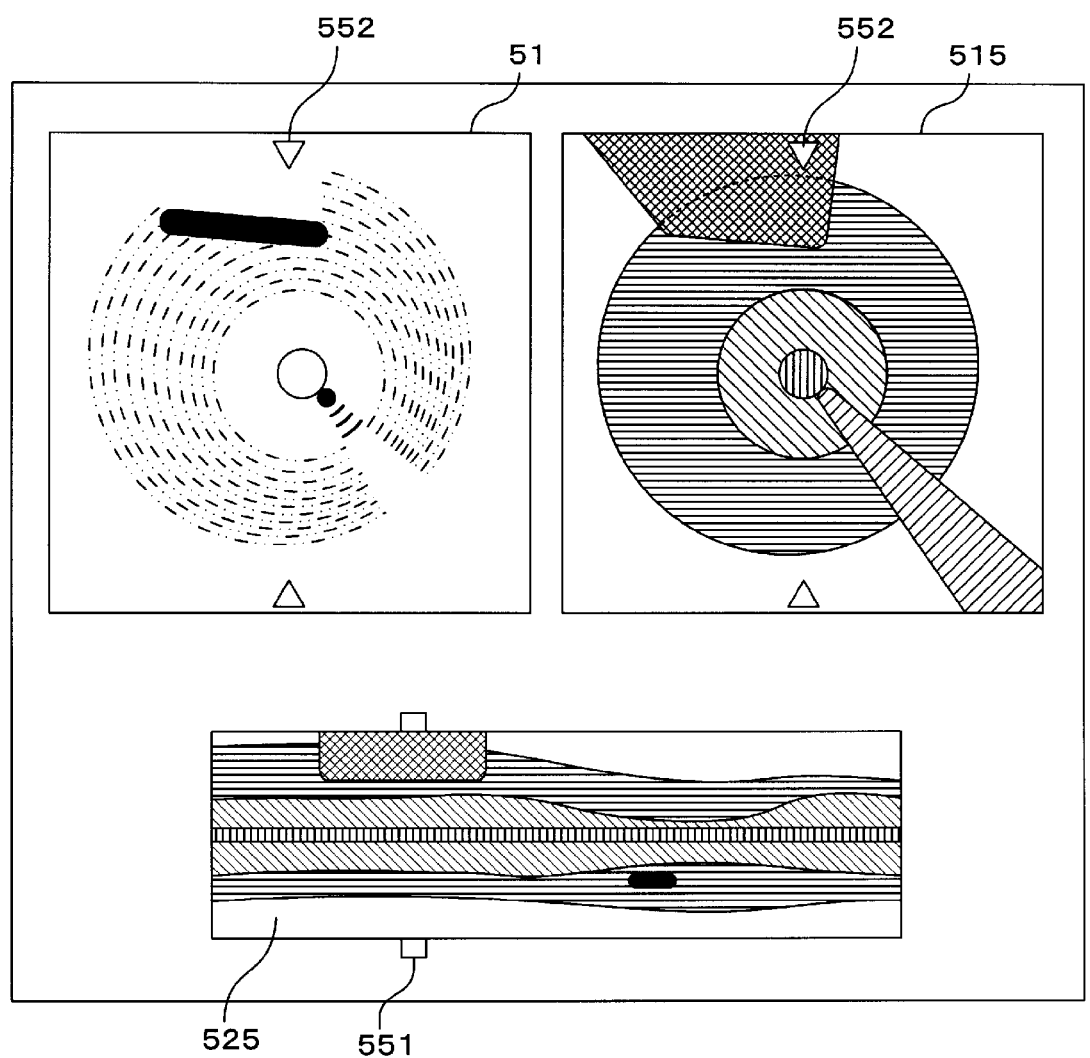
FIG. 5 illustrates an example of a screen displayed by the catheter system.

FIG. 5 illustrates an example of a screen displayed by the catheter system 10. The screen illustrated in FIG. 5 can include, for example, a lateral tomographic image field 51, a lateral object arrangement image field 515, and a longitudinal object arrangement image field 525. The lateral tomographic image field 51 displays the lateral tomographic image 485 described above. The lateral object arrangement image field 515 displays the object arrangement image 482 corresponding to the lateral tomographic image 485 displayed in the lateral tomographic image field 51.

The longitudinal object arrangement image field 525 displays the object arrangement image 482 corresponding to a longitudinal tomographic image. The object arrangement image 482 corresponding to the longitudinal tomographic image is formed based on the object arrangement image 482 corresponding to each of one set of lateral tomographic images 485 in a similar manner to the longitudinal tomographic image.

Specifically, a pixel at a position corresponding to the longitudinal tomographic image can be extracted from each object arrangement image 482, and an object arrangement image corresponding to the longitudinal tomographic image can be formed by performing an interpolation processing or the like and reconstructing. The method for generating the longitudinal object arrangement image field 525 is the same as a method for forming a longitudinal tomographic image from one set of lateral tomographic images 485, and thus detailed description of the method for generating the longitudinal object arrangement image field 525 will be omitted.

Three-dimensional data may be generated based on one set of lateral tomographic images 485, and three-dimensional semantic segmentation for assigning a label indicating a type of an object to each voxel may be performed. The object arrangement image 482 corresponding to a longitudinal tomographic image can be generated from a three-dimensional object arrangement image generated from a result of a three-dimensional semantic segmentation.

A lateral tomographic position marker 551 indicating a position of the lateral tomographic image 485 displayed in the lateral tomographic image field 51 and the lateral object arrangement image field 515 is displayed at an edge of the longitudinal object arrangement image field 525. A longitudinal tomographic position marker 552 indicating a position of the longitudinal tomographic image displayed in the longitudinal tomographic image field 52 is displayed in the vicinity of edges of the lateral tomographic image field 51 and the lateral object arrangement image field 515.

A user can change a cross section to be displayed as appropriate by operating the input apparatus 32 to change positions of the lateral tomographic position marker 551 and the longitudinal tomographic position marker 552. Note that the control unit 21 may receive a voice input from the user.

The user can check a state of a lesion area in a long-axis direction on a screen illustrated in FIG. 5. Note that FIG. 5 illustrates an example of a screen display, and the present disclosure is not limited the example of the screen display as illustrated in FIG. 5. For example, a three-dimensional display serving as an aggregation of lateral cross sections may be displayed on the screen display.

Figure 6:
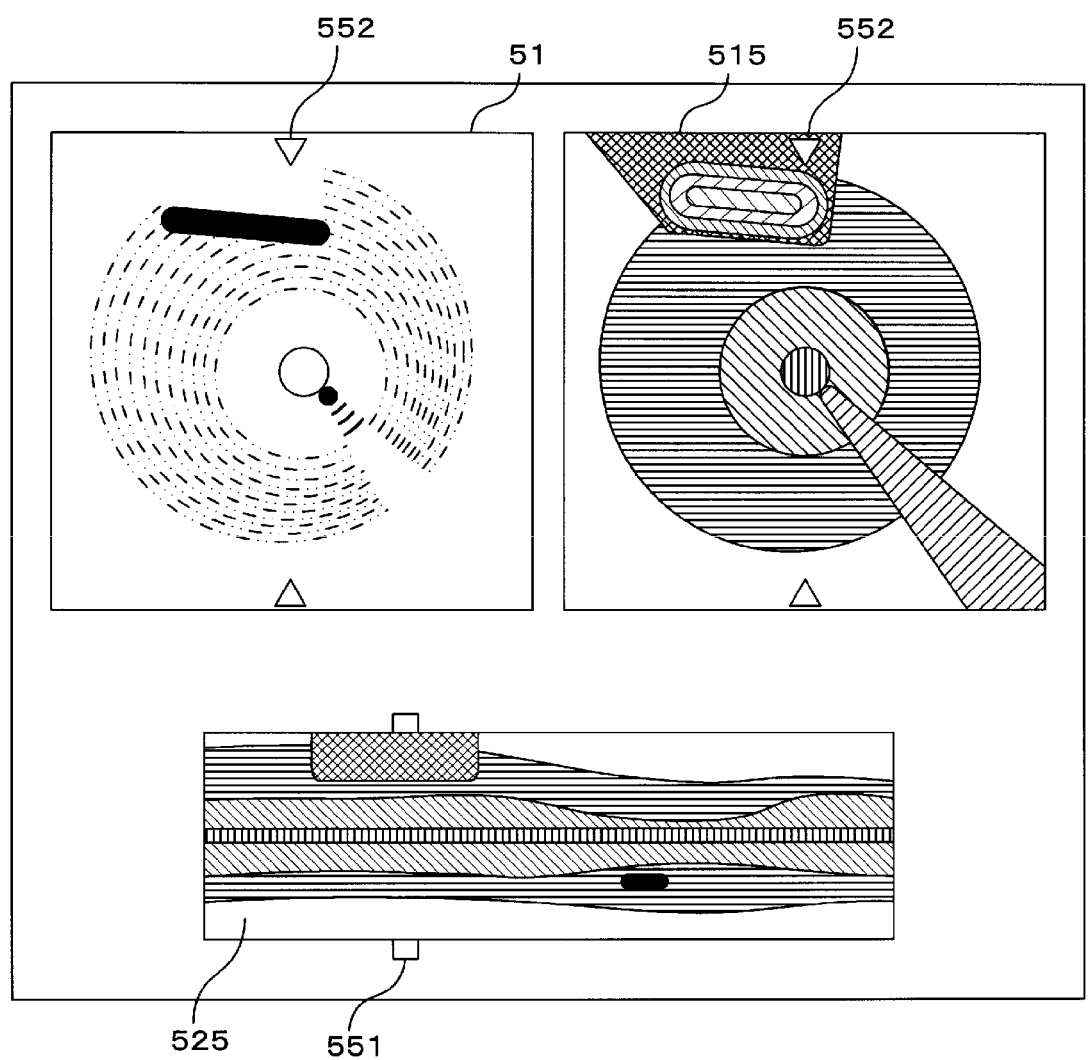
FIG. 6 illustrates an example of a screen displayed by the catheter system.

FIG. 6 illustrates an example of a screen displayed by the catheter system 10. When a user gives an instruction to display a probability at which a determination of "calcification" is correct for pixels constituting the object indicating "calcification", the control unit 21 displays the screen illustrated in FIG. 6. An enlarged view of a portion indicating "calcification" is shown in an upper part of FIG. 6.

Note that the probability at which the determination for the pixels is correct is output from the first model 61 described with reference to FIG. 4. The control unit 21 generates the pixels of different colors based on the probability at which the pixels are classified into the object indicating "calcification".

For example, the control unit 21 can express the probability at which the determination of "calcification" is correct by giving a gradation to brightness or saturation while maintaining a hue indicating "calcification" in common. The control unit 21 may paint and classify the entire lateral object arrangement image field 515 based on a determination probability indicating correctness of a determination on an object for each pixel with a probability.

The user can recognize a degree of reliability about the determination of "calcification" from the screen illustrated in FIG. 6. When the determination of "calcification" is output with a relatively low probability, it is desirable that the user sufficiently observes the lateral tomographic image 485 displayed in the lateral tomographic image field 51 based on a professional point of view (i.e., the user views the lateral tomographic image 485 personally rather than relying on the determination made by the control unit 21).

Figure 7:
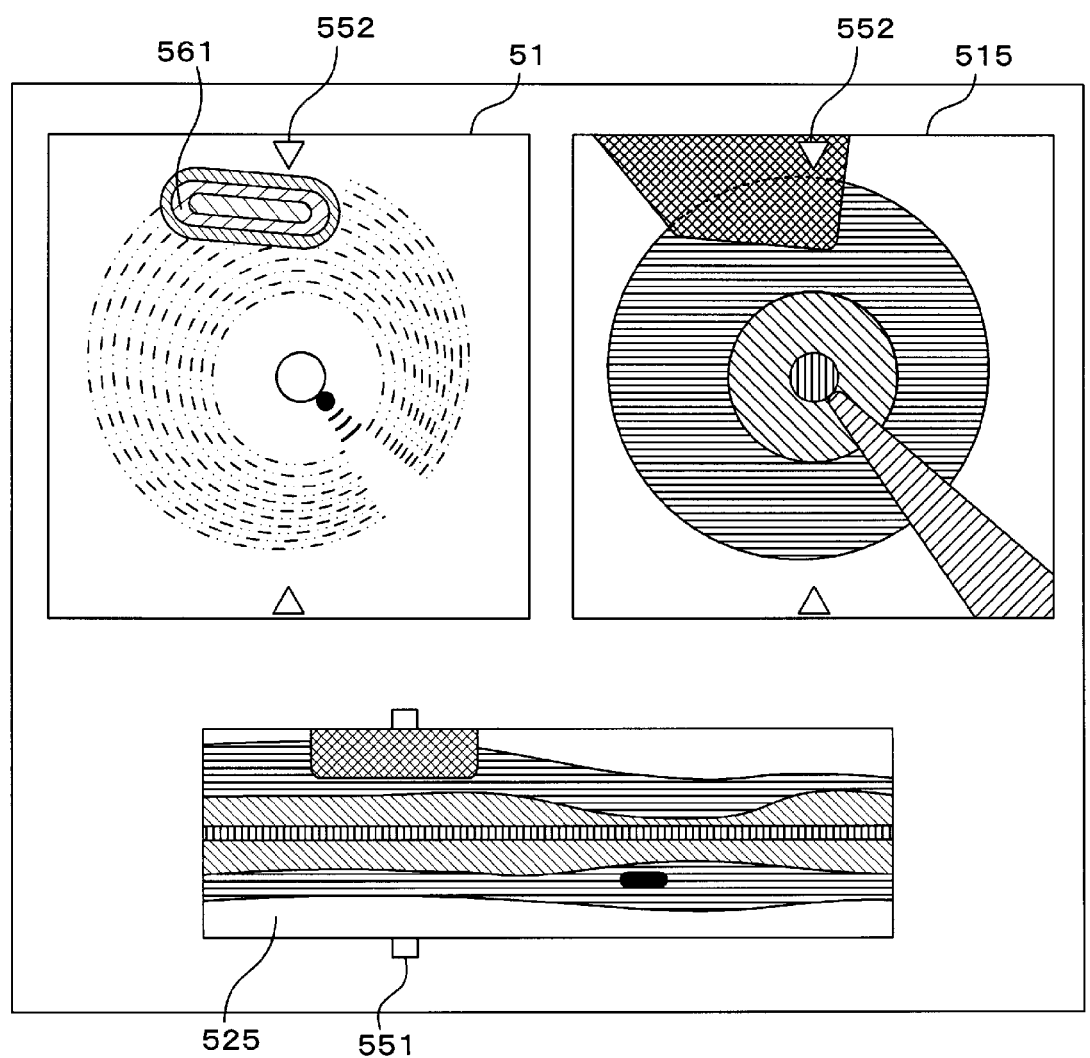
FIG. 7 illustrates an example of a screen displayed by the catheter system.

FIG. 7 illustrates an example of a screen displayed by the catheter system 10. When the user gives an instruction to show a basis for a portion indicating "calcification", the control unit 21 displays the screen illustrated in FIG. 7. The control unit 21 displays the lateral tomographic image 485 superimposed with a basis marker 561 indicating a basis area serving as a basis for the determination of "calcification" in the lateral tomographic image field 51. The basis marker 561 is an example of basis information about a basis of an object displayed in the lateral object arrangement image field 515.

The control unit 21 extracts the basis area using a model visualization method such as gradient-weighted class activation mapping (Grad-CAM) or Grad-CAM++. The basis area is an area that has a strong influence on an output of a pixel determined to be "calcification" among the plurality of lateral tomographic images 485 input to a learning model 65. The basis marker 561 is displayed using finer hatching as the degree of influence on the output increases.

The user can determine whether the basis of the determination made by the control unit 21 is appropriate based on a professional point of view from the screen illustrated in FIG. 7.

Figure 8:
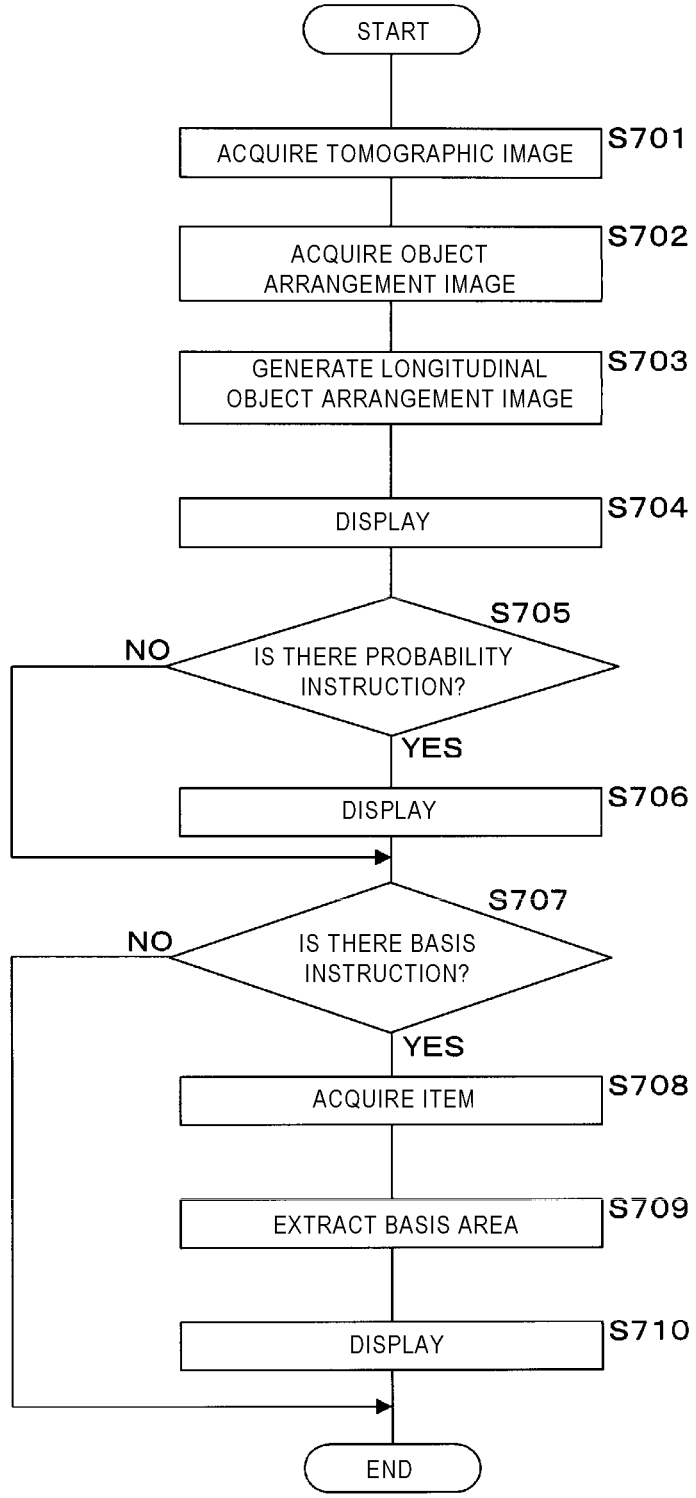
FIG. 8 is a flowchart illustrating a flow of a processing in accordance with a program.

FIG. 8 is a flowchart illustrating a flow of a processing in accordance with a program. The control unit 21 acquires one set of lateral tomographic images 485 from the catheter control unit 271 (S701). The control unit 21 inputs the acquired lateral tomographic images 485 to the first model 61, acquires the object arrangement image 482 in which types of a plurality of objects included in the lateral tomographic images 485 are associated with ranges of the respective objects, and acquires a probability at which a determination of an object for each pixel is correct (S702).

The control unit 21 generates a longitudinal tomographic image of the object arrangement image 482 based on the one set of the object arrangement images 482 (S703). In the following description, the longitudinal tomographic image of the object arrangement images 482 is referred to as a longitudinal object arrangement image. The control unit 21 records the generated longitudinal object arrangement image in the auxiliary storage apparatus 23 in response to an operation of the user on the longitudinal tomographic position marker 552 so that the longitudinal object arrangement image indicated by a designated cross section can be quickly displayed.

The control unit 21 displays the screen described with reference to FIG. 5 on the display apparatus 31 (S704). The control unit 21 determines whether an instruction to display a determination probability of an object is received from the user (S705). The user can input an instruction to display the probability by, for example, double-clicking an object in the lateral object arrangement image field 515. The control unit 21 may receive a voice input from the user.

When it is determined that the instruction to display the probability is received (YES in S705), the control unit 21 displays the image described with reference to FIG. 6 based on the probability at which the determination of an object for each pixel acquired in S702 is correct (S706).

When it is determined that no instruction to display the probability is received (NO in S705) or after S706 is completed, the control unit 21 determines whether an instruction to display the basis is received from the user (S707). The user can input the instruction to display the basis by, for example, performing an operation such as swiping an object in the lateral object arrangement image field 515. The control unit 21 may receive a voice input from the user.

When it is determined that the instruction to display the basis is received (YES in S707), the control unit 21 acquires an item for displaying the basis (S708). The control unit 21 extracts a basis area related to the item acquired in S708 by a model visualization method such as Grad-CAM and Grad-CAM++ (S709).

The control unit 21 displays the lateral tomographic image 485 on which the basis marker 561 is superimposed in the lateral tomographic image field 51 on the screen described with reference to FIG. 7 (S710). When it is determined that no instruction to display the basis is received (NO in S707) or after S710 is completed, the control unit 21 ends the processing.

According to the present embodiment, it is possible to provide the catheter system 10 that can be rather easily used by a user who is not sufficiently familiar with interpretation of a tomographic image.

According to the present embodiment, it is possible to provide the catheter system 10 that assists a user to interpret a tomographic image using the object arrangement image 482. Since the user can rather quickly grasp what is displayed in which position of the tomographic image, the user can focus on observing an important portion when performing a diagnosis and a treatment.

According to the present embodiment, it is possible to provide the catheter system 10 that displays a determination probability of an object for each pixel. It is possible to provide the catheter system 10 with which a user can grasp the degree of reliability about the determination using the first model 61.

According to the present embodiment, it is possible to provide the catheter system 10 that displays the basis for the determination of an object. It is possible to provide the catheter system 10 with which a user can confirm the basis for the determination using the first model 61.

Second Embodiment

The present embodiment relates to the catheter system 10 in which a catheter control apparatus 27 and the information processing apparatus 20 are separate from each other. Description of portions common to those in the first embodiment will be omitted.

Figure 9:
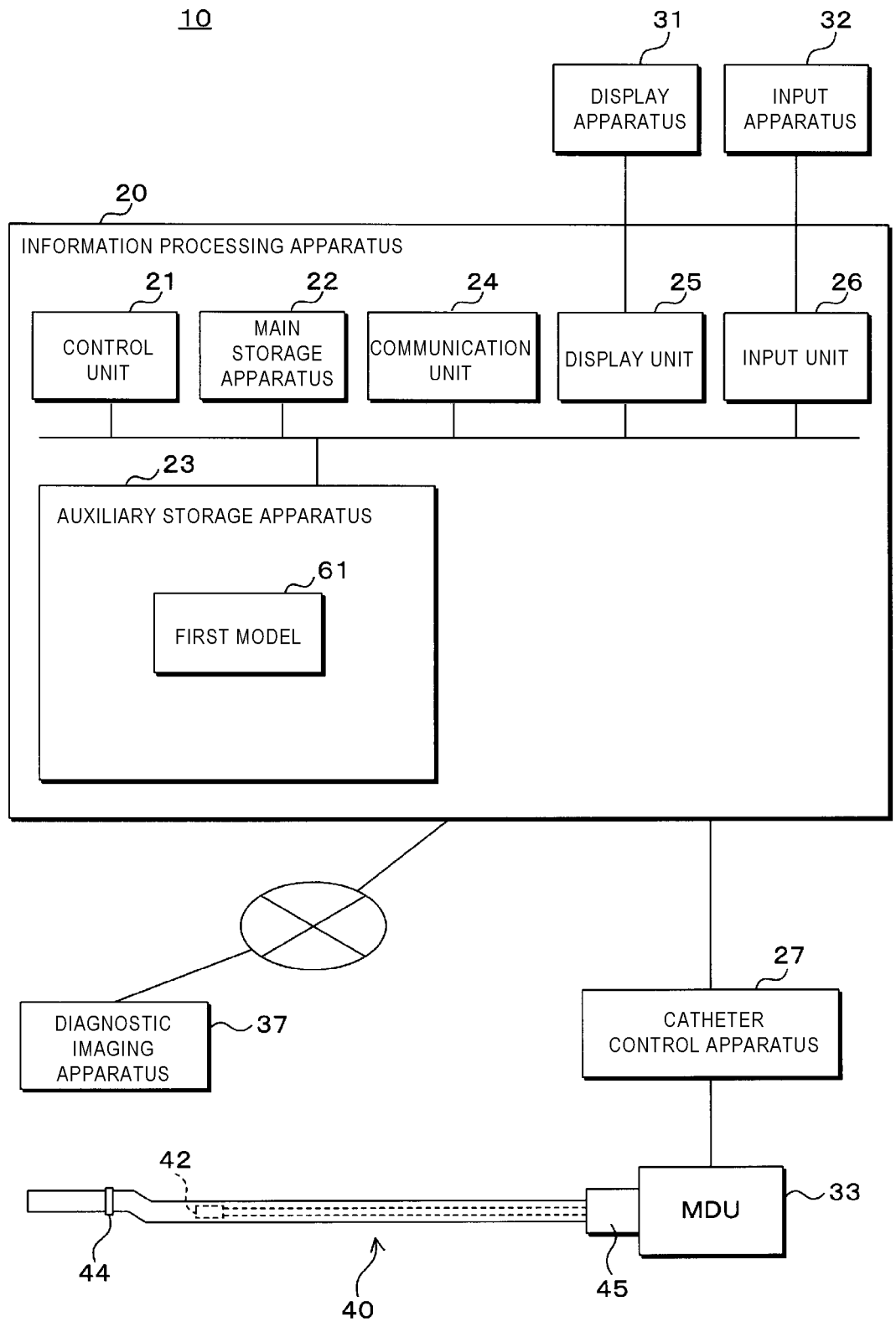
FIG. 9 is a diagram illustrating a configuration of a catheter system according to a second embodiment.

FIG. 9 is a diagram illustrating a configuration of the catheter system 10 according to a second embodiment. The catheter system 10 according to the present embodiment includes the information processing apparatus 20, the catheter control apparatus 27, the MDU 33, and the diagnostic imaging catheter 40. The information processing apparatus 20 includes the control unit 21, the main storage apparatus 22, the auxiliary storage apparatus 23, the communication unit 24, the display unit 25, the input unit 26, and a bus.

The catheter control apparatus 27 is an IVUS ultrasound diagnostic apparatus that controls the MDU 33, controls the sensor 42, generates the lateral tomographic image 485 and a longitudinal tomographic image based on a signal received from the sensor 42, and the like. The function and configuration of the catheter control apparatus 27 are the same as those of an ultrasound diagnostic apparatus.

The catheter control apparatus 27 and the information processing apparatus 20 may be directly connected to each other via a cable or wireless communication, or may be connected to each other via a network.

The information processing apparatus 20 according to the present embodiment can be, for example, a general-purpose personal computer, a tablet, a smartphone, a large computer, a virtual machine operated on a large computer, a cloud computing system, or a quantum computer. The information processing apparatus 20 may be a plurality of personal computers or the like that perform a distributed processing.

Third Embodiment

The present embodiment relates to the catheter system 10 that displays quantitative information such as a length and an area of a portion depicted in a tomographic image. Description of portions common to those in the first embodiment will be omitted.

Figure 10:
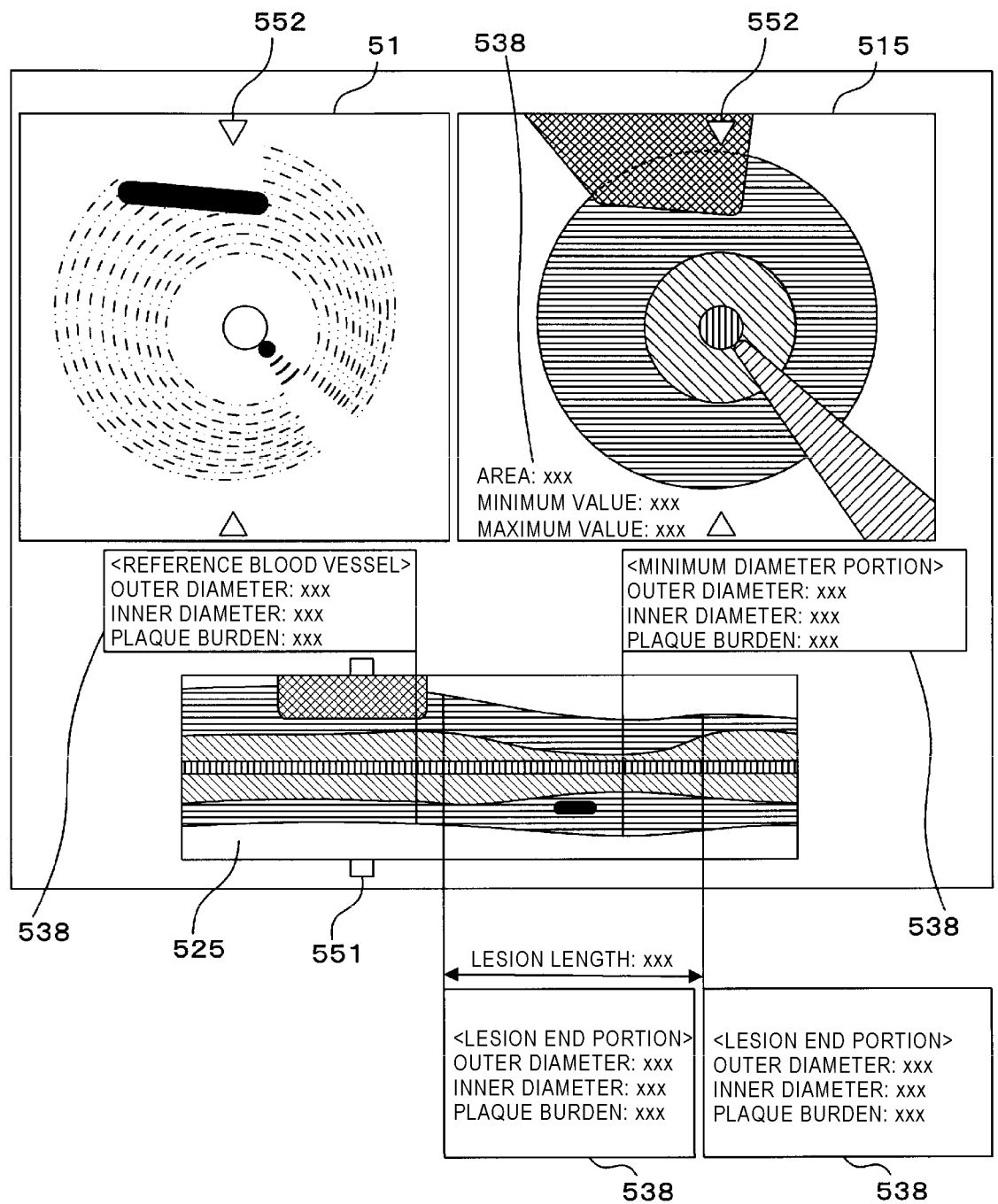
FIG. 10 illustrates an example of a screen displayed by a catheter system according to a third embodiment.
Figure 11:
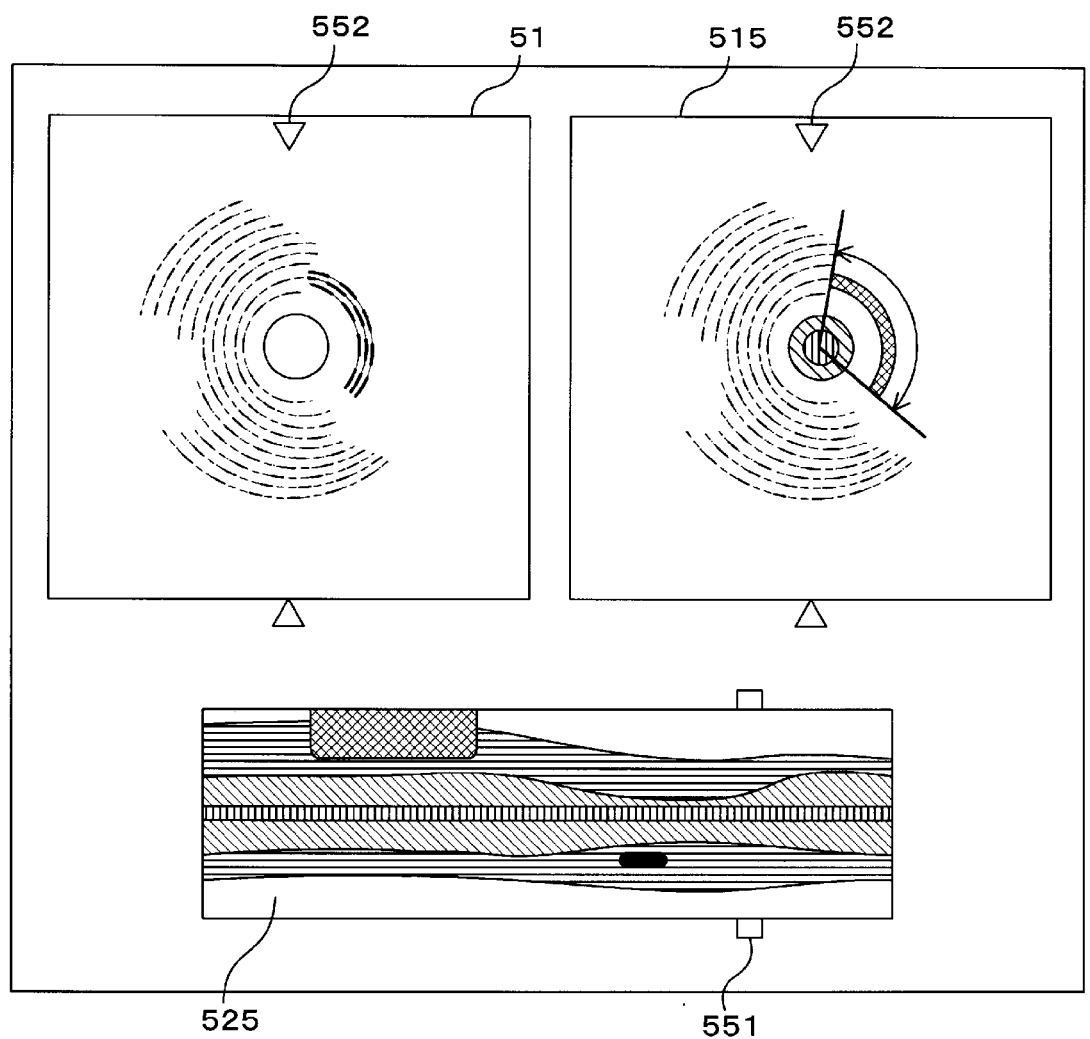
FIG. 11 illustrates an example of a screen displayed by the catheter system according to the third embodiment.
Figure 12:
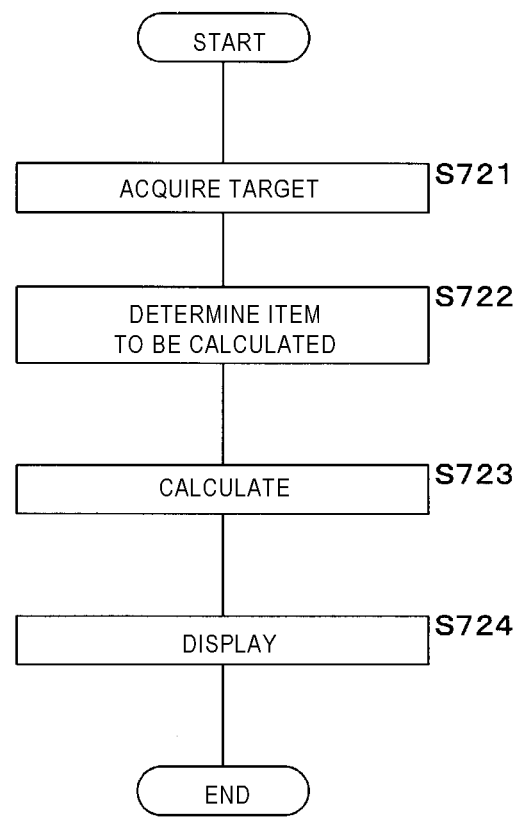
FIG. 12 is a flowchart illustrating a flow of a processing in accordance with a program according to the third embodiment.

FIGS. 10 to 12 are examples of screens displayed by the catheter system according to the third embodiment. In the screen illustrated in FIG. 10, a value label 538 is displayed in each of the lateral object arrangement image field 515 and the longitudinal object arrangement image field 525 on the screen described with reference to FIG. 5.

The control unit 21 calculates quantitative information such as a length, an area, and a volume related to an object designated by a user based on the object arrangement image 482 corresponding to one set of lateral tomographic images 485. For example, when an area is calculated, the control unit 21 integrates the number of pixels constituting an object and an area per pixel. When a volume is calculated, the control unit 21 further adds a thickness per slice to the calculated area. For example, the method for calculating quantitative information based on any graphic can be a known method.

Hereinafter, a case where a designated object is an "inner side of a lumen organ" and a stenotic lesion is included in the one set of lateral tomographic images 485 will be described as an example. The control unit 21 determines a position where a diameter is the smallest, that is, a position where the lumen organ is most stenotic, based on a diameter of the "inner side of the lumen organ" calculated from each object arrangement image 482. The control unit 21 determines both ends of the lesion based on a predetermined determination criterion.

In FIG. 10, the value label 538 displayed at a lower left side of the lateral object arrangement image field 515 shows an area of an "inner side of a lumen organ" indicated by hatching with lines downward to the right, a minimum value of a diameter, and a maximum value of the diameter.

The longitudinal object arrangement image field 525 displays a total of four vertical lines indicating positions of a "reference blood vessel", two "lesion end portions", and a "minimum diameter portion". The "reference blood vessel" refers to a portion where there is no lesion.

Corresponding value labels 538 are displayed at ends of the respective vertical lines. The value label 538 shows a minimum value and a maximum value of a diameter of an "inner side of a lumen organ" and a plaque burden at each position. A "lesion length" is displayed between two vertical lines indicating the two "lesion end portions".

For example, when a user clicks the vicinity of the vertical line indicating the position of a "minimum diameter portion", the lateral tomographic position marker 551 moves to the position of the "minimum diameter portion". The lateral tomographic image 485 of the "minimum diameter portion" and the lateral object arrangement image field 515 are displayed in the lateral tomographic image field 51 and the lateral object arrangement image field 515. The user can check a state of the "minimum diameter portion".

Similarly, when the user clicks the vicinity of the vertical line indicating the position of the "reference blood vessel" or the "lesion end portion", the lateral tomographic position marker 551 moves to a corresponding position. The user can relatively easily check a state of a portion that is a point at the time of determination.

The user can perform a diagnosis and a treatment based on a tissue property and a numerical value displayed by the value label 538 and a determination criterion defined by an academic society or the like. For example, the user determines the necessity of a vasodilatation surgery, a surgical procedure, and the like based on a blood vessel diameter, a degree of stenosis, a lesion length, or a distribution state of calcification. The control unit 21 may display information related to the relevant determination criterion together with the value label 538.

FIG. 11 shows a state in which a user moves the lateral tomographic position marker 551 to the right side of the longitudinal object arrangement image field 525. The lateral tomographic image 485 different from that illustrated in FIG. 10 is displayed in the lateral tomographic image field 51. The lateral object arrangement image field 515 shows the object arrangement image 482 corresponding to the lateral tomographic image 485 displayed in the lateral tomographic image field 51.

The lateral object arrangement image field 515 illustrated in FIG. 11 displays objects indicating "a cross section of the diagnostic imaging catheter 40" indicated by hatching with vertical lines, "an inner side of a lumen organ" indicated by hatching with lines downward to the right, and "calcification" indicated by grid-like hatching. The lateral tomographic image 485 can be displayed in a portion where no object is displayed. A user can confirm a state of a lumen organ present around the object indicating "calcification".

The object indicating "calcification" is displayed in an arc shape. The control unit 21 calculates an angle for the "calcification" with reference to the center of a "lumen organ wall", and displays the angle in the value label 538.

A specific example of a method for calculating the angle will be described. The control unit 21 calculates a circle having a shape similar to an outer periphery of the "inner side of the lumen organ", that is, an inner surface of the lumen organ wall. The control unit 21 extracts vectors extending from the center of the calculated circle to both ends of the object indicating "calcification". The control unit 21 calculates an angle between the two extracted vectors. Note that the method for calculating the angle can be any method, and is not limited to the method described above.

The control unit 21 calculates an inner diameter, an outer diameter, a minimum inner diameter, and a maximum inner diameter for a cylindrical object such as the "lumen organ wall" or the "inner side of the lumen organ", and displays the calculated inner diameter, outer diameter, minimum inner diameter, and maximum inner diameter in the value label 538. The control unit 21 calculates an angle for an object having an arc shape such as the "calcification" illustrated in FIG. 11 and displays the angle in the value label 538. Note that the control unit 21 may display a thickness, a volume, and the like for the object indicating "calcification" illustrated in FIG. 11.

Which item is to be displayed in the value label 538 may be designated by the user each time. An item to be displayed in the value label 538 may be defined by default in accordance with a type, a shape, and the like of an object.

FIG. 12 is a flowchart illustrating a flow of a processing in accordance with a program according to the third embodiment. The program illustrated in FIG. 12 is executed when a user gives an instruction to display the value label 538 after the control unit 21 displays the screen described with reference to FIG. 5 in S704 in accordance with the program described with reference to FIG. 8.

The user can give an instruction to display the value label 538 by, for example, tapping an object displayed in the lateral object arrangement image field 515. Note that the control unit 21 may receive a voice input from the user.

The control unit 21 acquires designation for an object to be displayed with the value label 538 based on the instruction from the user (S721). The control unit 21 determines an item to be calculated based on a shape or the like of the designated object (S722).

The control unit 21 calculates the item determined in S722 (S723). As described with reference to FIGS. 10 and 11, the control unit 21 displays the value label 538 (S724). Thereafter, the control unit 21 ends the processing.

Fourth Embodiment

The present embodiment relates to the catheter system 10 that uses a second model 62 configured to output information about a lumen organ or a state about a periphery of the lumen organ when a tomographic image is input. Description of portions common to those in the first embodiment will be omitted.

Figure 13:
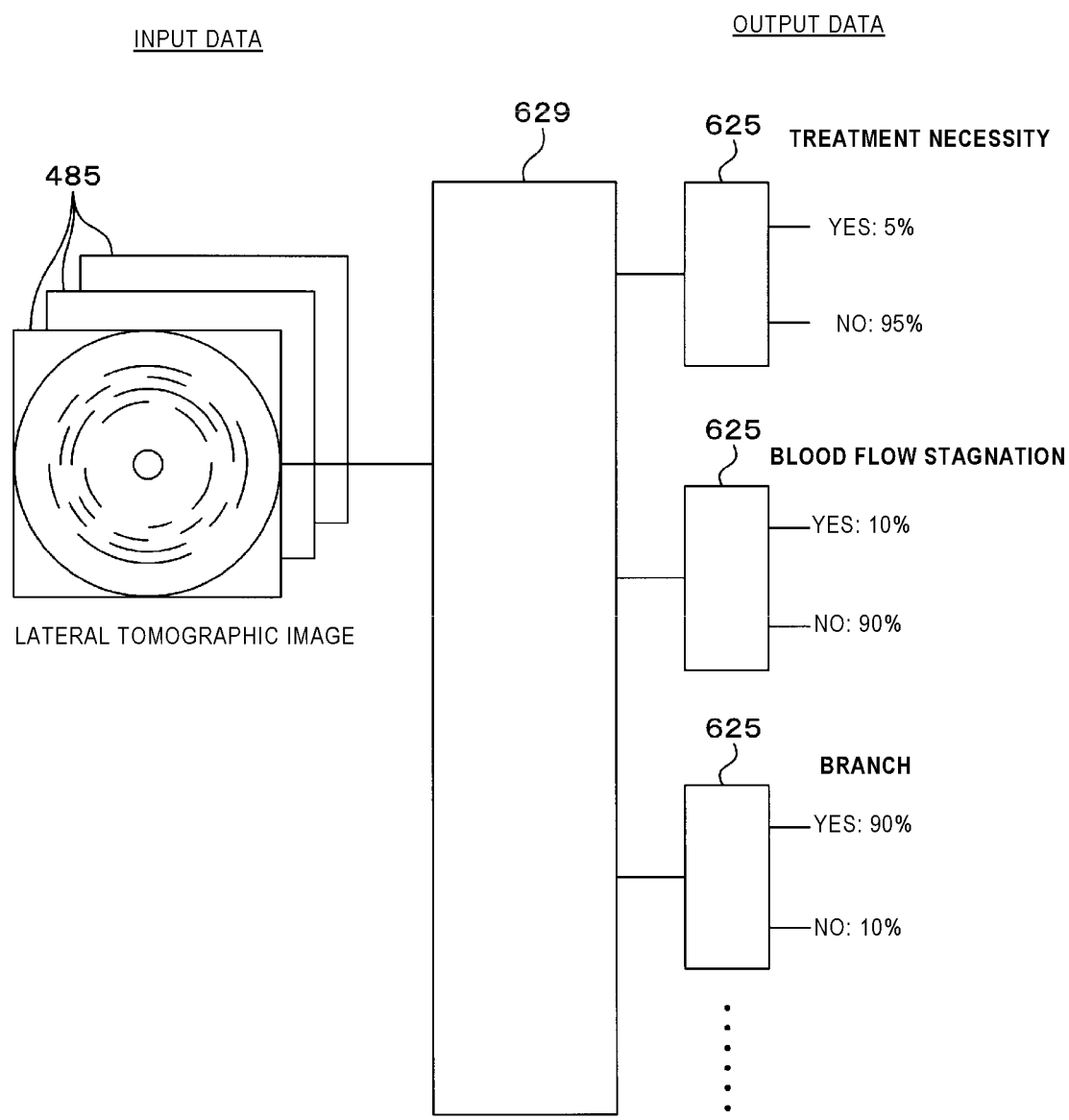
FIG. 13 is a diagram illustrating a configuration of a second model.

FIG. 13 is a diagram illustrating a configuration of the second model 62. The second model 62 is a model that receives one set of lateral tomographic images 485 and outputs a finding related to a state of a lumen organ or a state about a periphery of the lumen organ, such as a treatment necessity, the presence or absence of blood flow stagnation, or the presence or absence of a branch. Note that the "treatment necessity" may be a necessity for an interventional radiology (IVR) for performing a treatment inside the lumen organ, or may be a necessity for a general treatment including taking medicine, a dietary therapy, and the like.

The finding output by the second model 62 are a probability related to predetermined options such as "Yes" and "No" for each of a plurality of items. Tables 1 to 5 show examples of items for which the second model 62 outputs a probability. One row in the Tables 1 to 5 indicates one item. The second model 62 outputs a probability of an option for each item. Tables 1 to 5 show examples of items included in the finding output by the second model 62.

Table 1 shows information about the treatment necessity.

TABLE 1

| Item | Option |
|---|---|
| Treatment Necessity | Yes or No |

Table 2 shows an item related to blood flow information.

TABLE 2

| Item | Option |
| --- | --- |
| Blood Flow Stagnation | Yes or No |

Table 3 shows items related to qualitative shape information about a lumen organ and a periphery of the lumen organ.

TABLE 3

| Item | Option |
| --- | --- |
| Branch | Yes or No |
| Plaque Rupture | Yes or No |
| Lumen Irregularity | Yes or No |
| Flap | Yes or No |
| Dissociation | Yes or No |
| Multi-vessel | Yes or No |

Table 4 shows items related to property information indicating a property about a lumen organ and a periphery of the lumen organ.

TABLE 4

| Item | Option |
| --- | --- |
| Degree of Calcification | High, Medium, Low, No |
| Depth of Calcification | Superficial, Deep, No |
| Attenuating Plaque | Yes or No |
| Plaque Internal Bleeding | Yes or No |
| Stenosis in Stent | Yes or No |
| Hematoma | Yes or No |
| Lumen Type | False Lumen or True Lumen |
| Tumor | Yes or No |
| Spasm | Yes or No |

"Stenosis in stent" shown in Table 4 indicates, for example, the presence or absence of stenosis in a stent indwelled in a lumen organ several months ago or several years ago. When the lateral tomographic image 485 is captured immediately after a treatment of placing the stent, the lateral tomographic image 485 indicates the presence or absence of stenosis of the placed stent. That is, the lateral tomographic image 485 may be a tomographic image indicating an untreated lumen organ, a tomographic image indicating a lumen organ during a progress observation after a treatment, or a tomographic image indicating a lumen organ captured immediately after a series of lumen organ internal treatment is completed.

Table 5 shows items related to device information indicating a state of an indwelled device such as a stent disposed in a lumen organ.

TABLE 5

| Item | Option |
| --- | --- |
| Stent | Yes or No |
| Stent Overlap | Yes or No |
| Stent Edge | Yes or No |
| Abnormal Stent (Damage) | Yes or No |
| Abnormal Stent (Malapposition) | Yes or No |
| Abnormal Stent (Protrusion) | Yes or No |

The items shown in the Tables 1 to 5 are examples. The second model 62 may output probabilities for some of the items shown in Tables 1 to 5. The second model 62 may output a probability for an item other than the items shown in the Tables 1 to 5.

Options for each of the items shown in the Tables 1 to 5 are examples. For example, three or more options such as "large", "small", and "no" may be used for items displayed with two options such as "Yes" and "No" in each table.

In the following description, the second model 62 that receives an input of one set of lateral tomographic images 485 obtained by one image acquisition and outputs a finding related to a state of a lumen organ or a state about a periphery of the lumen organ will be described as an example. Note that the second model 62 may be a model that receives an input of one lateral tomographic image 485 and outputs a finding related to a state of a lumen organ or a state about a periphery of the lumen organ.

As described above, one image acquisition may be performed by one pull-back operation using the MDU 33. The second model 62 may be a model that receives an input of a part of the lateral tomographic images 485, for example, such as a half or ⅓ of the lateral tomographic images 485 obtained by one pull-back operation, and outputs a finding related to a state of a lumen organ or a state about a periphery of the lumen organ.

The second model 62 includes an input layer, a neural network 629, a plurality of softmax layers 625, and an output layer. The neural network 629 can be, for example, a convolutional neural network (CNN) having a fully connected layer and a set of a plurality of convolution layers and pooling layers. One softmax layer 625 is provided for one row shown in each of the Tables 1 to 5.

One set of lateral tomographic images 485 in a scanning order is combined into one image, and the one image is input to the input layer. A probability for each item shown in the Tables 1 to 5 is output to the output layer via the neural network 629 and the softmax layer 625.

For example, in FIG. 13, the probability of "no" for a "treatment necessity" is 95%, the probability of "no" for "blood flow stagnation" is 90%, and the probability of "yes" for a "branch" is 90%. Note that the second model 62 may be divided for each of the Tables 1 to 5. The second model 62 may be divided for each item to be output.

A selection layer for selecting and outputting an option having a highest probability may be provided at a subsequent stage of the softmax layer 625.

Data of a previous stage for forming the lateral tomographic image 485, such as sound ray data acquired by the catheter control unit 271 from the sensor 42, may be input to the second model 62.

Figure 14:
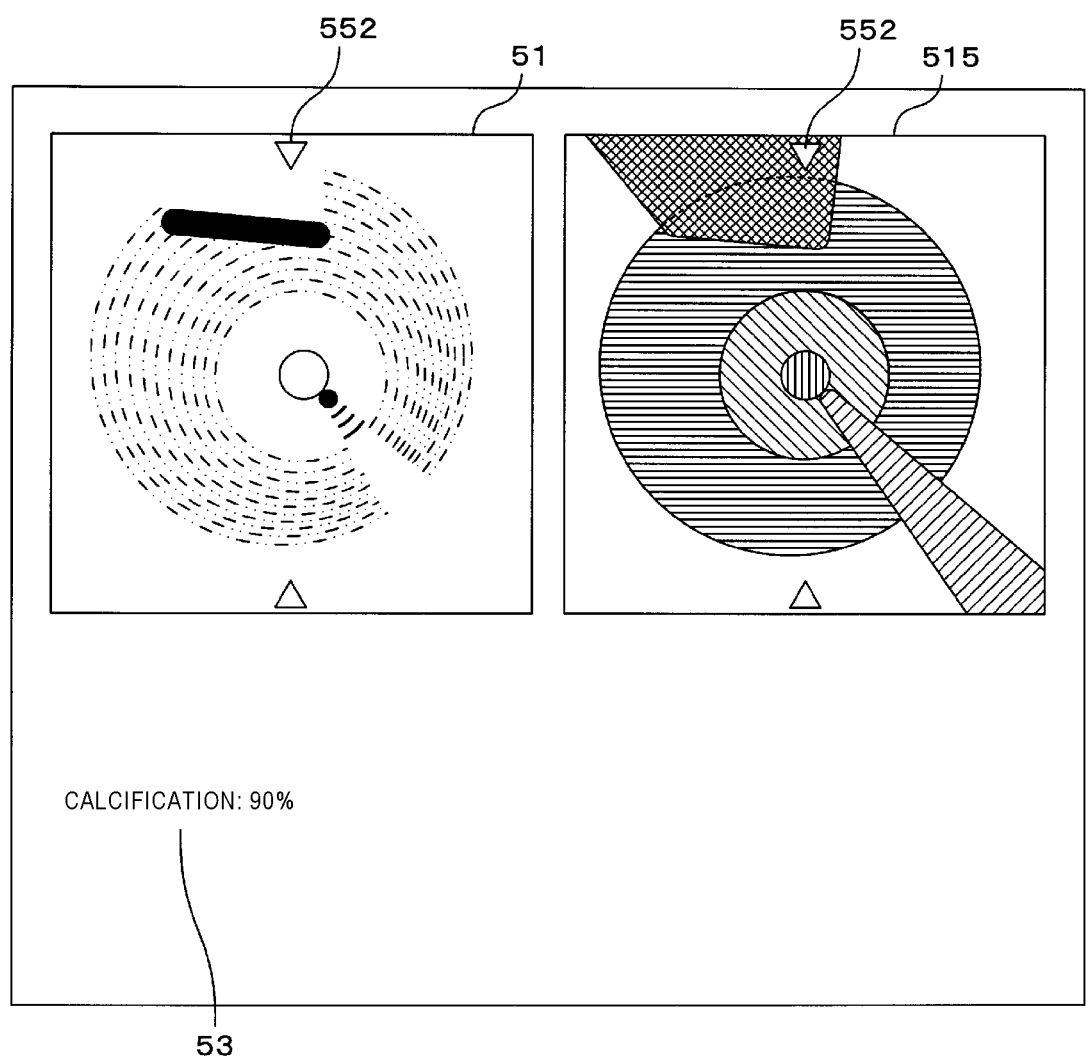
FIG. 14 illustrates an example of a screen displayed by a catheter system according to a fourth embodiment.

FIG. 14 illustrates an example of a screen displayed by the catheter system 10 according to the fourth embodiment. The screen illustrated in FIG. 14 includes the lateral tomographic image field 51, the lateral object arrangement image field 515, and a finding field 53. The lateral tomographic image field 51 and the lateral object arrangement image field 515 are the same as those on the screen displayed by the catheter system 10 according to the first embodiment described with reference to FIG. 5, and thus description of the lateral tomographic image field 51 and the lateral object arrangement image field 515 will be omitted.

A finding is displayed in the finding field 53. The control unit 21 selects a finding with a probability higher than a predetermined threshold from findings output from the second model 62, and displays the selected finding in the finding field 53.

The control unit 21 may select a finding related to the lateral tomographic image 485 displayed in the lateral tomographic image field 51 and display the selected finding in the finding field 53. Although not illustrated in FIG. 14, the control unit 21 may display the longitudinal object arrangement image field 525 as in FIG. 5.

Figure 15:
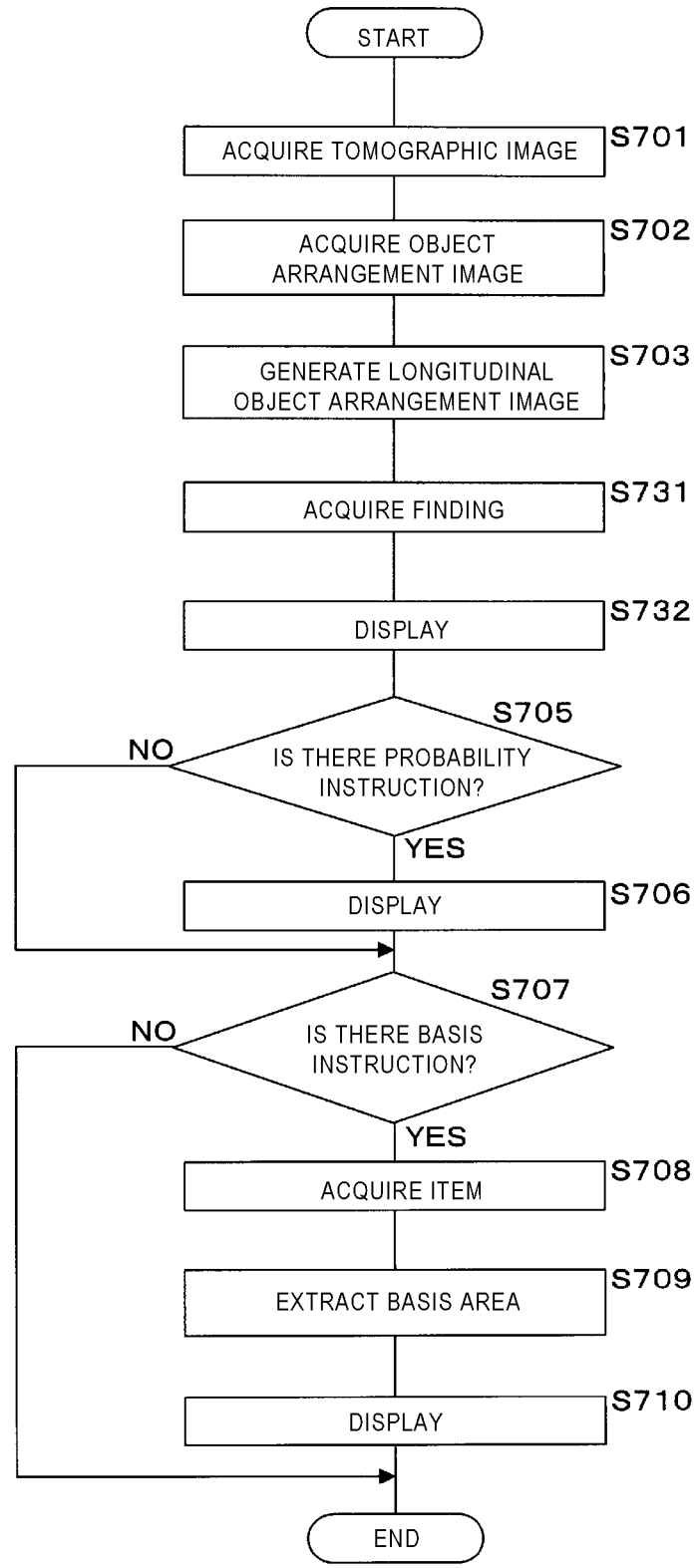
FIG. 15 is a flowchart illustrating a flow of a processing in accordance with a program according to the fourth embodiment.

FIG. 15 is a flowchart illustrating a flow of a processing in accordance with a program according to the fourth embodiment. S701 to S703 are the same as those in accordance with the program according to the first embodiment described with reference to FIG. 8, and thus description of S701 to S703 will be omitted.

The control unit 21 inputs the lateral tomographic image 485 acquired in S701 to the second model 62 to acquire a finding (S731). The control unit 21 displays the screen described with reference to FIG. 14 on the display apparatus 31 (S732). The control unit 21 determines whether an instruction to display a determination probability of an object is received from the user (S705). Subsequent processing are the same as those in accordance with the program according to the first embodiment described with reference to FIG. 8, and thus description of the subsequent proceeding (S705 through S710) will be omitted.

According to the present embodiment, it is possible to provide the catheter system 10 that displays a finding in addition to the object arrangement image 482.

Note that the control unit 21 may display the basis marker 561 indicating a basis of a finding displayed in the finding field 53. The control unit 21 can extract a basis area related to a finding output from the second model 62 by, for example, a model visualization method such as Grad-CAM or Grad-CAM++.

In addition to the lateral tomographic image 485, medical information acquired in real time, such as an image captured by the diagnostic imaging apparatus 37, a blood pressure, a heart rate, and oxygen saturation, may be input to the first model 61 and the second model 62. In addition to the lateral tomographic image 485, medical information acquired from an electronic chart, such as a previous disease, a height, a weight, and a previous image captured by the diagnostic imaging apparatus 37, may be input to the first model 61 and the second model 62.

In this case, the first model 61 receives the lateral tomographic image 485 and the medical information, and outputs the object arrangement image 482 in which types of the plurality of objects included in the lateral tomographic image 485 and ranges of the respective objects are mapped in association with each other. Similarly, the second model 62 receives the lateral tomographic image 485 and the medical information, and outputs a finding related to a state of a lumen organ or a state about a periphery of the lumen organ.

Since the medical information other than the lateral tomographic image 485 is included in the data input to the first model 61, it is possible to provide the catheter system 10 that relatively accurately classifies objects. Since the medical information other than the lateral tomographic image 485 is included in the data input to the second model 62, it is possible to provide the catheter system 10 that outputs a finding with relatively high accuracy.

Fifth Embodiment

The present embodiment relates to the catheter system 10 that superimposes and displays a position of a tomographic image captured using the diagnostic imaging catheter 40 on an image acquired from the diagnostic imaging apparatus 37. Description of portions common to those in the first embodiment will be omitted.

Figure 16:
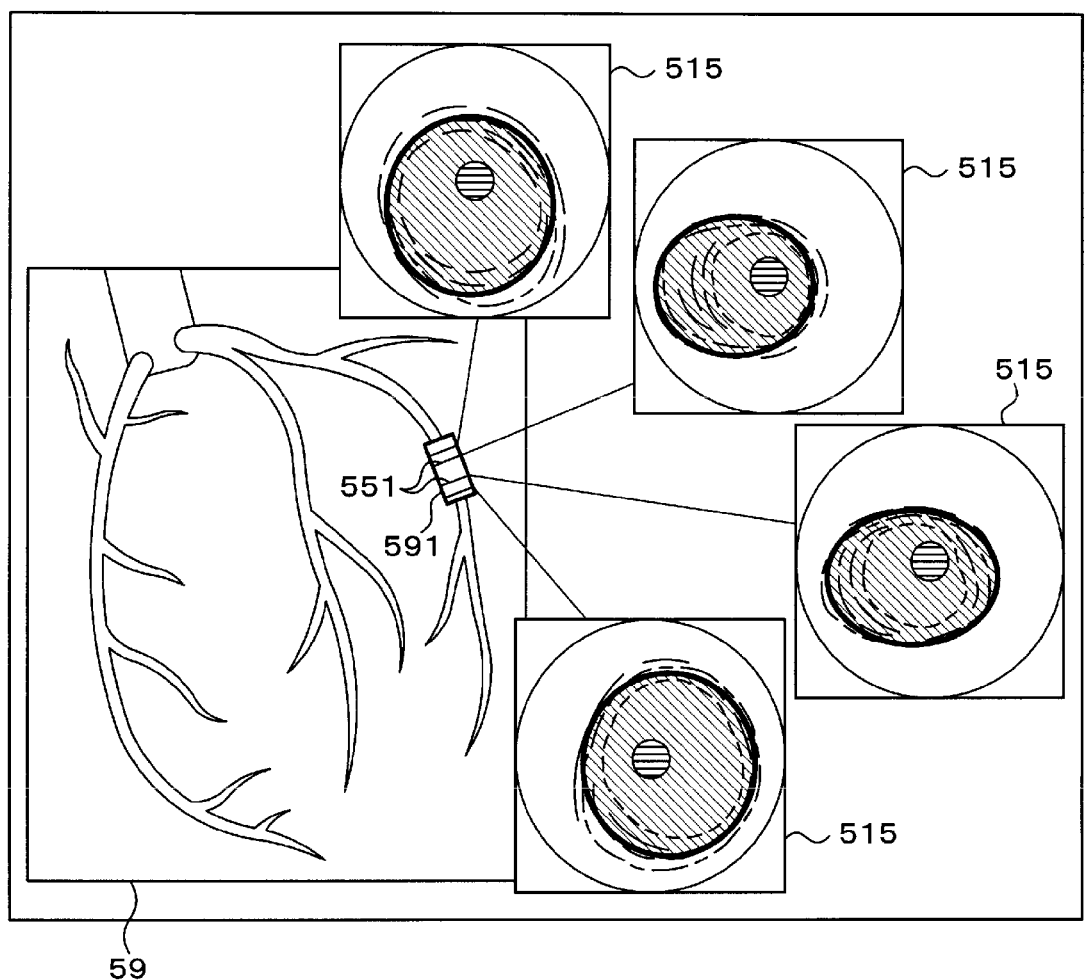
FIG. 16 illustrates an example of a screen displayed by a catheter system according to a fifth embodiment.

FIG. 16 illustrates an example of a screen displayed by the catheter system 10 according to the fifth embodiment. The screen illustrated in FIG. 16 includes an other apparatus image field 59. A medical image captured by the diagnostic imaging apparatus 37 is displayed in the other apparatus image field 59.

A scan area 591 indicating a position of the tomographic image captured by the diagnostic imaging catheter 40 is superimposed and displayed in the other apparatus image field 59 in a rectangular shape indicating an outer shape of a longitudinal tomographic image. The control unit 21 may display a longitudinal tomographic image or a longitudinal object arrangement image inside the scan area 591 in real time. The control unit 21 may receive a selection related to a display form of the scan area 591 from a user.

An outline of a method for displaying the scan area 591 will be described by taking a case where the diagnostic imaging apparatus 37 is an X-ray blood vessel imaging apparatus as an example. The sensor 42 is mounted on a sensor marker that does not transmit X-rays. Since the distal end marker 44 and the sensor marker do not transmit X-rays, the distal end marker 44 and the sensor marker can be clearly displayed in a medical image captured by the X-ray blood vessel imaging apparatus.

The control unit 21 detects the distal end marker 44 and the sensor marker from the medical image. The detected sensor marker indicates a position of the sensor 42. For example, when one set of lateral tomographic images 485 is generated by a pull-back operation using the MDU 33, both ends of an operation range of the sensor 42 when the images are acquired correspond to positions of short sides of the scan area 591.

The control unit 21 determines a length of each short side of the scan area 591 based on a display range of the lateral tomographic images 485 and a scale of an other apparatus image 59. The control unit 21 superimposes and displays the rectangular scan area 591 defined by positions of the short sides and lengths of the short sides in the other apparatus image field 59 in which a medical image is displayed.

With the above processing, even when a distal end portion of the diagnostic imaging catheter 40 is not parallel to a projection plane of the diagnostic imaging apparatus 37, the control unit 21 can display the scan area 591 at a correct position of the other apparatus image field 59.

The description is continued by referring back to FIG. 16. A plurality of lateral tomographic position markers 551 are displayed in the scan area 591. The lateral object arrangement image fields 515 for displaying the object arrangement images 482 corresponding to the respective lateral tomographic position markers 551 are displayed around the other apparatus image field 59. A user can appropriately change a tomographic position of each of the object arrangement images 482 by moving the lateral tomographic position markers 551 via the input apparatus 32. Note that the control unit 21 may receive a voice input from the user.

The control unit 21 may switch and display the object arrangement image 482 and the lateral tomographic image 485 based on an instruction from the user. The control unit 21 may display the object arrangement image 482 and the lateral tomographic image 485 side by side. The control unit 21 may display a longitudinal tomographic image or a longitudinal object arrangement image.

Instead of the medical image captured by the diagnostic imaging apparatus 37, the control unit 21 may display a schema schematically representing a lumen organ in the other apparatus image field 59. It is possible to provide the catheter system 10 in which a user can rather easily grasp a position of a tomographic image.

Figures 17, 18:
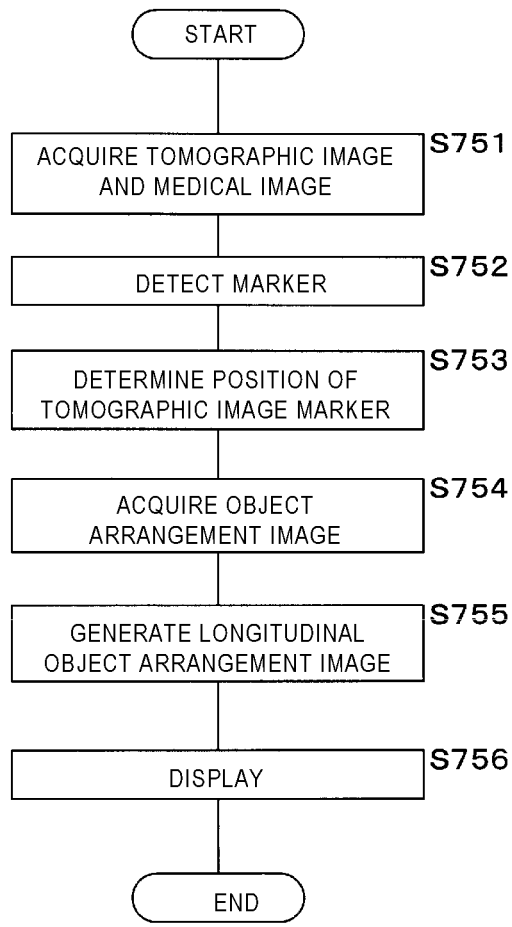
FIG. 17 is a flowchart illustrating a flow of a processing in accordance with a program according to the fifth embodiment.
FIG. 18 is a diagram illustrating a record layout of a training data DB.

FIG. 17 is a flowchart illustrating a flow of a processing in accordance with a program according to the fifth embodiment. The control unit 21 acquires the lateral tomographic image 485 and the medical image respectively from the catheter control unit 271 and the diagnostic imaging apparatus 37 at the time of one image acquisition (S751).

The control unit 21 detects the distal end marker 44 and the sensor marker from the medical image (S752). For example, when one set of lateral tomographic images 485 is generated by a pull-back operation using the MDU 33, the control unit 21 determines a position and a dimension of the scan area 591 based on positions of the sensor marker detected at both ends of the pull-back operation. The control unit 21 determines a position of the lateral tomographic position marker 551 based on the scan area 591 (S753).

It is desirable that the control unit 21 traces and displays, in real time, a position corresponding to the scan area 591 on a medical image captured thereafter.

The control unit 21 inputs the lateral tomographic image 485 acquired in S751 to the first model 61, acquires the object arrangement image 482 in which types of a plurality of objects included in the lateral tomographic image 485 are associated with ranges of the respective objects, and acquires a probability at which a determination of an object for each pixel is correct (S754).

The control unit 21 generates a longitudinal object arrangement image based on one set of object arrangement images 482 (S755). The control unit 21 records the generated longitudinal object arrangement image in the auxiliary storage apparatus 23 in response to an operation from the user on the longitudinal tomographic position marker 552 so that the longitudinal object arrangement image indicated by a designated cross section can be rather quickly displayed.

The control unit 21 displays the screen described with reference to FIG. 16 on the display apparatus 31 (S756). Thereafter, the control unit 21 ends the processing.

According to the present embodiment, it is possible to provide the catheter system 10 that superimposes and displays a tomographic image captured by the diagnostic imaging catheter 40 or a position of the object arrangement image 482 generated based on the tomographic image on the medical image captured by the diagnostic imaging apparatus 37. A user can rather easily change a position of the lateral tomographic image 485 to be displayed by operating the lateral tomographic position marker 551. As described above, it is possible to provide the catheter system 10 with which a user can rather easily grasp a positional relationship between a tomographic image and an organ around the tomographic image.

Note that the diagnostic imaging apparatus 37 is not limited to the X-ray blood vessel imaging apparatus. For example, a tomographic image different from the tomographic image captured by the diagnostic imaging catheter 40 can also be captured in real time by an ultrasound diagnostic apparatus combined with an external probe or a transesophageal echocardiography (TEE) probe.

When the diagnostic imaging catheter 40 is equipped with both the ultrasound sensor 42 and the OCT sensor 42, the lateral tomographic image 485 captured using ultrasound and the lateral tomographic image 485 captured using OCT can be captured in substantially the same cross section.

The control unit 21 may superimpose and display the object arrangement image 482 obtained from the lateral tomographic image 485 captured using OCT having excellent resolution on the lateral tomographic image 485 captured using ultrasound having excellent penetration depth compared to OCT. In addition, the control unit 21 may appropriately combine and display the lateral tomographic image 485 captured using OCT and the object arrangement image 482, or the lateral tomographic image 485 captured using ultrasound and the object arrangement image 482. It is possible to provide the catheter system 10 that displays information generated taking both advantages of ultrasound and OCT.

The medical image is not limited to a medical image captured in real time. The control unit 21 may superimpose and display the scan area 591 on a medical image that is captured by any diagnostic imaging apparatus such as a CT, an MRI, a PET, an X-ray blood vessel imaging apparatus, or an ultrasound diagnostic apparatus and that is recorded in an electronic chart or the like. The control unit 21 determines a position of the scan area 591 based on a branch of a blood vessel, a position of the heart, and the like included in each image.

The processing according to the present embodiment may be executed at the diagnostic imaging apparatus 37 side, and may be displayed on a display apparatus connected to the diagnostic imaging apparatus 37.

Sixth Embodiment

The present embodiment relates to a program for generating the first model 61 and the second model 62. Description of portions common to those in the fourth embodiment will be omitted.

FIG. 18 is a diagram illustrating a record layout of a training data database (DB). The training data DB is a database in which an input and a correct label are recorded in association with each other, and is used for training of a model by machine learning. The training data DB includes a tomographic image data field, a painting and classification data field, and a finding field. The finding field includes fields corresponding to findings output by the second model 62, such as a treatment necessity field, a blood flow stagnation field, and a branch field.

A set of lateral tomographic images 485 that can be used to generate a longitudinal tomographic image is recorded in the tomographic image data field. A set of images obtained by an expert painting and classifying the lateral tomographic images 485 in different colors or ground patterns for each object is recorded in the painting and classification data field. That is, an object corresponding to each pixel constituting the lateral tomographic image 485 is recorded in the painting and classification data field.

A result of an expert determining the treatment necessity based on the lateral tomographic image 485 recorded in the tomographic image data field is displayed in the treatment necessity field. Similarly, the presence or absence of blood flow stagnation is recorded in the blood flow stagnation field, and the presence or absence of a branch is recorded in the branch field.

The training data DB records a large number of combinations of a set of the lateral tomographic images 485 captured using the diagnostic imaging catheter 40, a set of images determined, painted and classified by a processional doctor or the like, and the treatment necessity. In the following description, a case where an interval between the lateral tomographic images 485 constituting one set of lateral tomographic images 485 is constant will be described as an example.

When the first model 61 is generated, a set of lateral tomographic images 485 recorded in the tomographic image data field is used as input data, and a set of images recorded in the painting and classification data field is used as correct data. When the second model 62 is generated, a set of lateral tomographic images 485 recorded in the tomographic image data field is used as input data, and data recorded in each finding field is used as a correct label.

For example, the training data DB may be created separately into a database for generating the first model 61 and a database for generating the second model 62.

Figure 19:
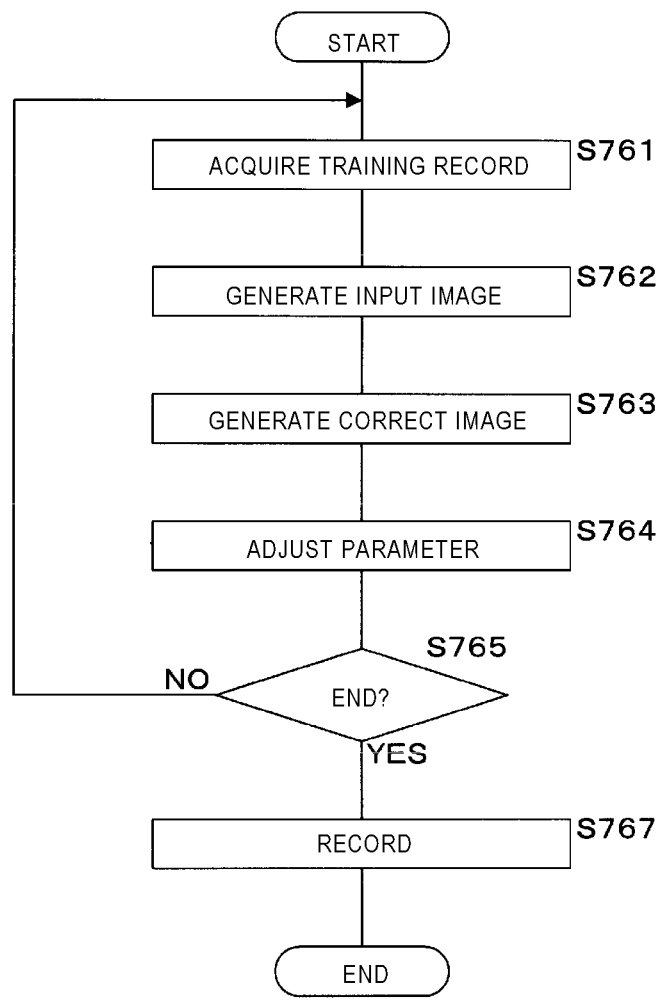
FIG. 19 is a flowchart illustrating a flow of a processing in accordance with a program according to a sixth embodiment.

FIG. 19 is a flowchart illustrating a flow of a processing in accordance with a program according to the fifth embodiment. A case where machine learning of the first model 61 is performed using the information processing apparatus 20 will be described as an example.

The program illustrated in FIG. 19 may be executed by hardware different from the information processing apparatus 20, and the first model 61 for which machine learning is completed may be copied to the auxiliary storage apparatus 23 via a network. The first model 61 learned by one kind of hardware can be used by a plurality of information processing apparatuses 20.

Prior to the execution of the program illustrated in FIG. 19, for example, an unlearned model such as a U-Net structure for implementing semantic segmentation is prepared. As described above, the U-Net structure includes a multilayer encoder layer and a multilayer decoder layer connected after the multilayer encoder layer. Each parameter of the prepared model is adjusted and machine learning is performed by executing the program illustrated in FIG. 19.

The control unit 21 acquires a training record to be used for training in one epoch from the training data DB (S761). The number of training records used for training in one epoch is a so-called hyperparameter and is appropriately determined.

The control unit 21 generates an input image based on the input data included in each acquired training record (S762). Specifically, the control unit 21 combines the lateral tomographic images 485 included in the tomographic image field in a scanning order to generate one image. Note that the combined lateral tomographic images may be recorded in the tomographic image data field.

The control unit 21 generates a correct image based on painting and classification data included in each acquired training record (S763). Specifically, the control unit 21 combines painting and classification images included in the painting and classification data field in a scanning order to generate one image. Note that the combined painting and classification images may be recorded in the painting and classification data field.

When an input image is input to the input layer of the model, the control unit 21 adjusts parameters of the model so as to output a correct image label from the output layer (S764).

The control unit 21 determines whether to end the processing (S765). For example, the control unit 21 determines to end the processing when learning of a predetermined epoch number is completed. The control unit 21 may acquire test data from the training data DB, input the test data to the model during machine learning, and determine to end the processing when an output with predetermined accuracy is obtained.

When the control unit 21 determines not to end the processing (NO in S765), the control unit 21 returns the processing to S761. When the control unit 21 determines to end the processing (YES in S765), the control unit 21 records parameters of the learned model in the auxiliary storage apparatus 23 (S767). Thereafter, the control unit 21 ends the processing. A learned model is generated through the above-described processing.

Figures 20, 21:
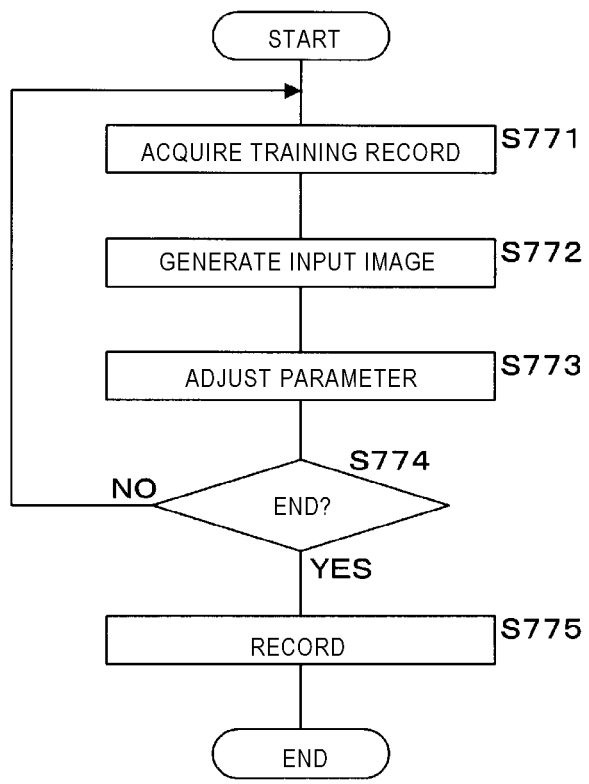
FIG. 20 is a flowchart illustrating a flow of a processing in accordance with the program according to the sixth embodiment.
FIG. 21 is a diagram illustrating a record layout of a first correction DB.

FIG. 20 is a flowchart illustrating a flow of a processing in accordance with a program according to the sixth embodiment. Similar to the processing illustrated in FIG. 19, a case where machine learning of the second model 62 is performed using the information processing apparatus 20 will be described as an example.

Prior to the execution of the program illustrated in FIG. 20, for example, an unlearned model such as a CNN having the softmax layer 625 and the neural network 629 including a convolution layer, a pooling layer, and a fully connected layer is prepared. The unlearned model is not limited to the CNN. For example, a model of any type such as a decision tree or a random forest can be used for the unlearned model. Each parameter of the prepared model is adjusted and machine learning is performed by executing the program illustrated in FIG. 20.

The control unit 21 acquires a training record to be used for training in one epoch from the training data DB (S771). The control unit 21 generates an input image based on input data included in each acquired training record (S772).

When an input data vector is input to the input layer of the model, the control unit 21 adjusts parameters of the model so as to output a correct label recorded in the finding field from the output layer (S773).

The control unit 21 determines whether to end the processing (S774). When the control unit 21 determines not to end the processing (NO in S774), the control unit 21 returns the processing to S771. When the control unit 21 determines to end the processing (YES in S774), the control unit 21 records parameters of the learned model in the auxiliary storage apparatus 23 (S775). Thereafter, the control unit 21 ends the processing. A learned model is generated through the above-described processing.

According to the present embodiment, a first learning model 651 and a second learning model 652 can be generated by machine learning.

Seventh Embodiment

The present embodiment relates to the catheter system 10 in which a user can correct a finding output from the learning model 65. Description of portions common to those in the first embodiment will be omitted.

FIG. 21 is a diagram illustrating a record layout of a first correction DB. The first correction DB is a database that records correction information in which the object arrangement image 482 output from the catheter system 10 is associated with a correction made by a user.

The first correction DB includes a tomographic image data field, an output data field, and a correction data field. A set of lateral tomographic images 485 that can be used to generate a longitudinal tomographic image is recorded in the tomographic image data field. The object arrangement image 482 output to the display apparatus 31 by the control unit 21 is recorded in the output data field. The object arrangement image 482 corrected by a user is recorded in the correction data field. The first correction DB has one record for each correction made by a user for a set of lateral tomographic images 485.

FIG. 22 illustrates an example of a screen displayed by the catheter system 10 according to the seventh embodiment. FIG. 22 illustrates a screen displayed on the display apparatus 31 by the control unit 21 when a user gives an instruction to correct the object arrangement image 482 while, for example, the screen described with reference to FIG. 6 is displayed.

The screen illustrated in FIG. 22 includes the lateral object arrangement image field 515, a candidate label field 571, a correct label field 572, and a shape correction button 574. A candidate for a label indicating a type of an object is displayed in the candidate label field 571. A label determined to be correct by the user is displayed in the correct label field 572.

The user designates an object whose type is to be changed using a cursor 575. Thereafter, the user drags and drops a label displayed in the candidate label field 571 to the correct label field 572 to input a correct label.

The control unit 21 replaces a label displayed in the correct label field 572 with the label designated by the user. The control unit 21 changes a color or a ground pattern of the object designated by the cursor 575 to a color or a ground pattern corresponding to the label selected by the user.

Note that the control unit 21 may receive an input by a voice input. For example, when the user utters "change calcification to hematoma", the control unit 21 changes an object displayed in a color or a ground pattern of "calcification" to a color or a ground pattern of "hematoma".

When the user selects the shape correction button 574, the control unit 21 receives a correction for a painting and classification shape of the object arrangement image 482 through a user interface in a configuration similar to paint software.

As described above, the user can appropriately correct the object arrangement image 482. The control unit 21 records the object arrangement image 482 corrected by the user in the first correction DB together with the object arrangement image 482 before the correction and a set of the lateral tomographic images 485.

FIG. 23 is a diagram illustrating a record layout of a second correction DB. The second correction DB is a database that records correction information in which a finding output from the catheter system 10 is associated with a correction made by a user. The correction DB has one record for each correction made by a user for a set of lateral tomographic images 485.

The correction DB includes a tomographic image data field, an output field, and a correction field. A set of lateral tomographic images 485 that can be used to generate a longitudinal tomographic image is recorded in the tomographic image data field. A finding output to the display apparatus 31 by the control unit 21 is recorded in the output field. A finding corrected by the user is recorded in the correction field.

Figure 24:
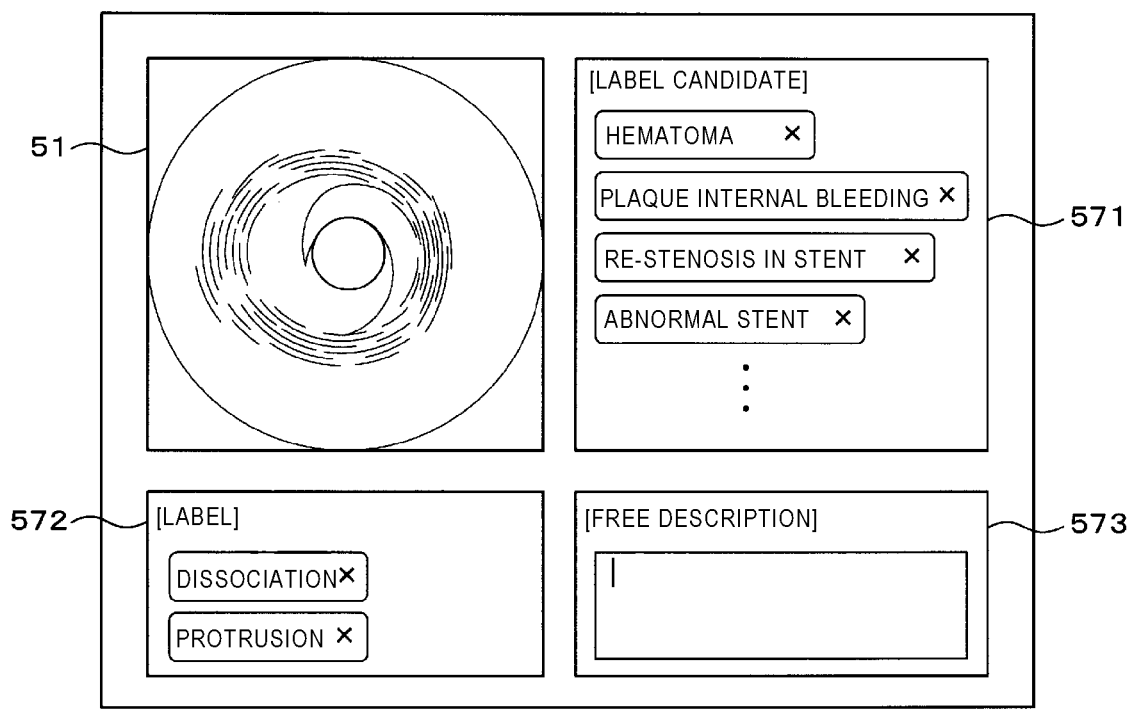
FIG. 24 illustrates an example of a screen displayed by the catheter system according to the seventh embodiment.

FIG. 24 illustrates an example of a screen displayed by the catheter system 10 according to the seventh embodiment. FIG. 24 illustrates a screen displayed on the display apparatus 31 by the control unit 21 when a user gives an instruction to correct the finding field 53 while, for example, the screen described with reference to FIG. 14 is displayed.

The screen illustrated in FIG. 24 includes the lateral tomographic image field 51, the candidate label field 571, the correct label field 572, and a free description field 573. A candidate for a label indicating a qualitative finding is displayed in the candidate label field 571. A label determined to be correct by the user is displayed in the correct label field 572.

The user can input a correct finding by dragging and dropping a label between the candidate label field 571 and the correct label field 572. Note that the control unit 21 may receive an input by a voice input. For example, when the user utters "correct, hematoma", the control unit 21 moves a label of "hematoma" in the first line of the candidate label field 571 to the correct label field 572.

When a label representing an appropriate finding is not found in the candidate label field 571, the user can input any finding using the free description field 573. The user can also change a quantitative finding as appropriate in a similar manner.

The control unit 21 records a correction content input by the user using the screen illustrated in FIG. 24 in the correction DB described with reference to FIG. 23.

The content corrected by the user using the screens illustrated in FIGS. 22 and 24 may be attached to an electronic chart in which a medical treatment result of a patient is recorded. Data recorded in the first correction DB and the second correction DB is utilized for relearning of the first model 61 and the second model 62, a correction of a hyper-parameter used at the time of machine learning performed by an engineer of the machine learning, and the like.

Eighth Embodiment

Figure 25:
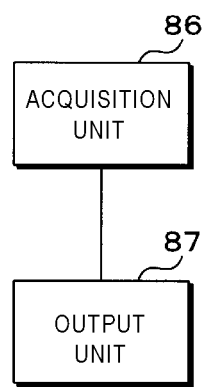
FIG. 25 is a functional block diagram illustrating a catheter system according to an eighth embodiment.

FIG. 25 is a functional block diagram illustrating the catheter system 10 according to the eighth embodiment. The catheter system 10 includes an acquisition unit 86 and an output unit 87. The acquisition unit 86 acquires a tomographic image generated using a diagnostic imaging catheter inserted into a lumen organ. When the tomographic image acquired by the acquisition unit 86 is input, the output unit 87 inputs the acquired tomographic image to the model 65 that outputs types of a plurality of objects included in the tomographic image and ranges of the respective objects in association with each other, and the output unit 87 outputs the types and the ranges of the objects output from the model 65.

Ninth Embodiment

Figure 26:
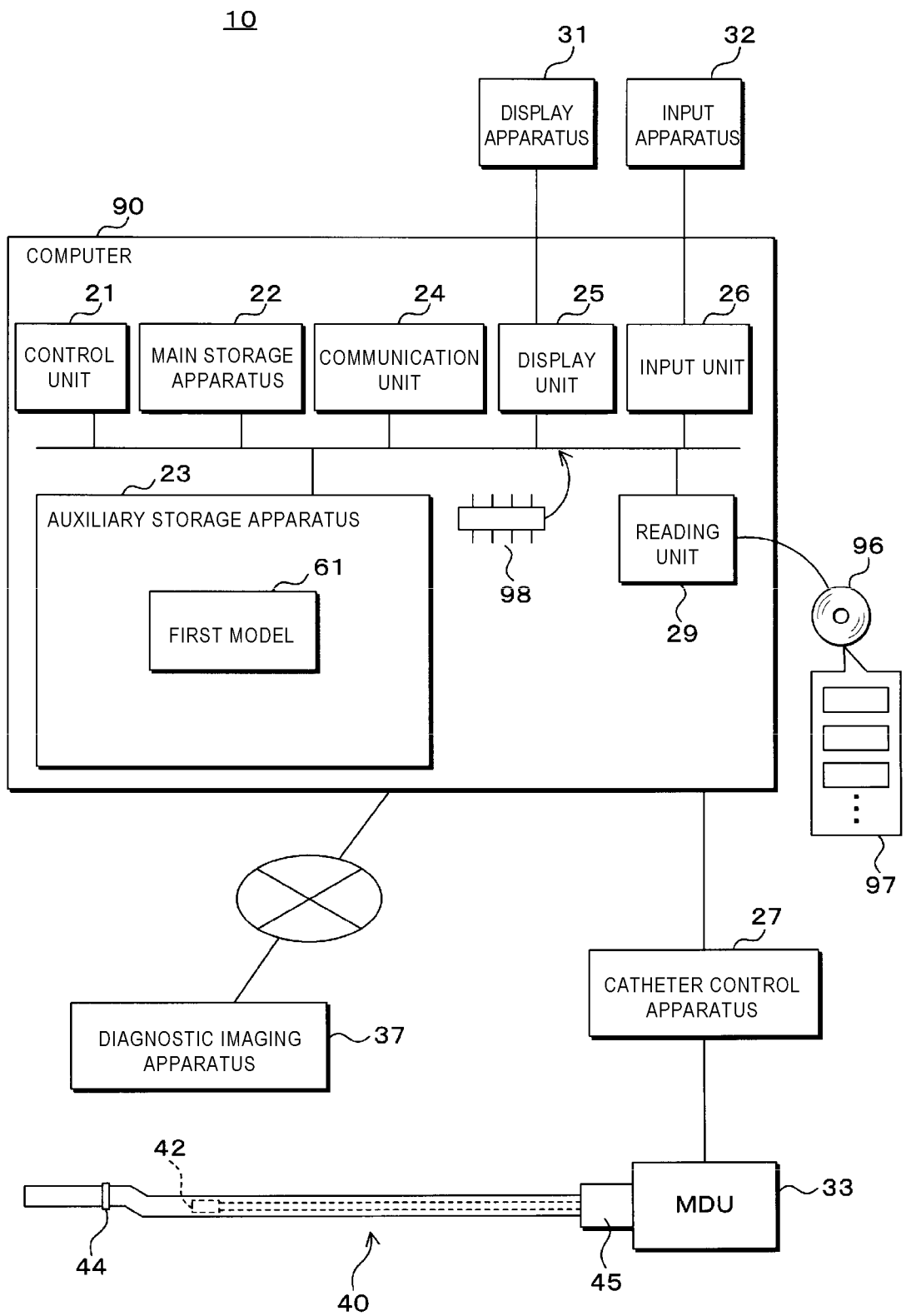
FIG. 26 is a diagram illustrating a configuration of a catheter system according to a ninth embodiment.

FIG. 26 is a diagram illustrating a configuration of a catheter system according to a ninth embodiment. The present embodiment relates to a form in which the information processing apparatus 20 according to the present embodiment is implemented by operating a general-purpose computer 90 and a program 97 in combination. FIG. 26 is a diagram illustrating a configuration of the information processing apparatus 20 according to the ninth embodiment. Description of portions common to those in the second embodiment will be omitted.

The catheter system 10 according to the present embodiment includes the computer 90. The computer 90 includes the control unit 21, the main storage apparatus 22, the auxiliary storage apparatus 23, the communication unit 24, the display unit 25, the input unit 26, a reading unit 29, and a bus. The computer 90 is an information apparatus such as a general-purpose personal computer, a tablet, a smartphone, or a server computer.

The program 97 is recorded in a portable recording medium 96. The control unit 21 reads the program 97 via the reading unit 29 and stores the program 97 in the auxiliary storage apparatus 23. The control unit 21 may read the program 97 stored in a semiconductor memory 98 such as a flash memory mounted in the computer 90. Further, the control unit 21 may download the program 97 from another server computer connected via the communication unit 24 and a network and store the program 97 in the auxiliary storage apparatus 23.

The program 97 can be installed as a control program of the computer 90, is loaded into the main storage apparatus 22, and is executed. Accordingly, the computer 90 functions as the information processing apparatus 20 described above.

Technical features (configuration requirements) described in each embodiment can be combined with one another to form new technical features.

The detailed description above describes embodiments of a program, an information processing method, a method for generating a learning model, a method for relearning a learning model, and an information processing system. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A non-transitory computer-readable medium (CRM) storing computer program code executed by a computer processor that executes a process comprising:
    acquiring a tomographic image generated using a diagnostic imaging catheter inserted into a lumen organ;
    inputting the acquired tomographic image to a first model configured to output types of a plurality of objects included in the tomographic image and ranges of the respective objects in association with each other when the tomographic image is input, and to output the types and the ranges of the objects output from the first model;
    storing the types and the ranges of the objects in a manner of being mapped and associated with a position of the tomographic image in the lumen organ; and
    wherein the tomographic image is a lateral tomographic image showing a cross section obtained by cutting the lumen organ and a periphery of the lumen organ in a direction intersecting a longitudinal direction of the lumen organ by:
        mapping and storing the types and the ranges of the objects for each of a plurality of the lateral tomographic images; and
        outputting the types and the ranges of the objects in a manner of being mapped with a longitudinal tomographic image that is generated based on the plurality of lateral tomographic images and that shows a cross section obtained by cutting the lumen organ and the periphery of the lumen organ in a direction along the longitudinal direction of the lumen organ.

2. The computer-readable medium according to claim 1, further comprising:
    displaying the types and the ranges of the objects in different forms for each type of the objects.

3. The computer-readable medium according to claim 1, further comprising:
    outputting the longitudinal tomographic image and a selected tomographic image selected from the plurality of lateral tomographic images at the same time; and
    displaying a marker indicating a position of the selected tomographic image on the longitudinal tomographic image.

4. The computer-readable medium according to claim 1, further comprising:
    superimposing and displaying the marker indicating the position of the tomographic image on a schema or a medical image different from the acquired tomographic image.

5. The computer-readable medium according to claim 1, further comprising:
    calculating a dimension, an area, or a volume of each of the objects based on the ranges of the objects; and
    outputting the calculated dimension, the area, or the volume.

6. The computer-readable medium according to claim 1, further comprising:
    calculating an angle of a range in which the lumen organ corresponds to an object selected from the objects based on the range of the object; and
    outputting the calculated angle of the range in which the lumen organ corresponds to the object selected from the objects based on the range of the object.

7. The computer-readable medium according to claim 1, further comprising:
    outputting basis information related to a type and a range of the object together with the types and the ranges of the objects output from the first model.

8. The computer-readable medium according to claim 1, wherein the first model is configured to output a probability indicating to which of the objects each pixel constituting the input tomographic image corresponds, further comprising:
    displaying the types and the ranges of the objects in hues determined for each type of the objects, and displaying differences in probabilities corresponding to the objects by differences in brightness or saturation of pixels.

9. The computer-readable medium according to claim 1, further comprising:
    receiving a correction for the types and the ranges of the objects.

10. The computer-readable medium according to claim 9, further comprising:
    recording correction information in which the acquired tomographic image is associated with the correction related to the types or the ranges of the objects.

11. The computer-readable medium according to claim 10, further comprising:
    performing relearning of the first model based on the correction information.

12. The computer-readable medium according to claim 1, further comprising:
    when the tomographic image is input, inputting the acquired tomographic image into a second model configured to output information about a state of the lumen organ or the periphery of the lumen organ; and
    outputting the information output from the second model.

13. The computer-readable medium according to claim 12, further comprising:
    receiving a correction for the state of the lumen organ or the periphery of the lumen organ.

14. The computer-readable medium according to claim 13, further comprising:
    recording correction information in which the acquired tomographic image is associated with the correction for the state of the lumen organ or the periphery of the lumen organ.

15. The computer-readable medium according to claim 14, further comprising:
    performing relearning of the second model based on the correction information.

16. A method for generating a learning model comprising:
    acquiring training data in which a plurality of sets of a tomographic image generated using a diagnostic imaging catheter inserted into a lumen organ, and types and ranges of objects included in the tomographic image are recorded in association with each other;

generating, using the training data, a learning model configured to output the types of a plurality of objects included in the tomographic image in association with the ranges of the objects when the tomographic image is input;

storing the types and the ranges of the objects in a manner of being mapped and associated with a position of the tomographic image in the lumen organ; and wherein the tomographic image is a lateral tomographic image showing a cross section obtained by cutting the lumen organ and a periphery of the lumen organ in a direction intersecting a longitudinal direction of the lumen organ by:

mapping and storing the types and the ranges of the objects for each of a plurality of the lateral tomographic images; and outputting the types and the ranges of the objects in a manner of being mapped with a longitudinal tomographic image that is generated based on the plurality of lateral tomographic images and that shows a cross section obtained by cutting the lumen organ and the periphery of the lumen organ in a direction along the longitudinal direction of the lumen organ.

17. The method according to claim 16, further comprising:

displaying the types and the ranges of the objects in different forms for each type of the objects.

18. An information processing system comprising:
a processor configured to:
acquire a tomographic image generated using a diagnostic imaging catheter inserted into a lumen organ;
input the acquired tomographic image to a model configured to output types of a plurality of objects included in the tomographic image and ranges of the respective objects in association with each other when the acquisition unit inputs the acquired tomographic image, and output the types and ranges of the objects output from the model;
store the types and the ranges of the objects in a manner of being mapped and associated with a position of the tomographic image in the lumen organ; and
wherein the tomographic image being a lateral tomographic image showing a cross section obtained by cutting the lumen organ and a periphery of the lumen organ in a direction intersecting a longitudinal direction of the lumen organ by:
mapping and storing the types and the ranges of the objects for each of a plurality of the lateral tomographic images; and
outputting the types and the ranges of the objects in a manner of being mapped with a longitudinal tomographic image that is generated based on the plurality of lateral tomographic images and that shows a cross section obtained by cutting the lumen organ and the periphery of the lumen organ in a direction along the longitudinal direction of the lumen organ.

* * * * *